(12) United States Patent
Gauthier

(10) Patent No.: US 11,199,281 B2
(45) Date of Patent: Dec. 14, 2021

(54) DUAL-LATCH QUICK CONNECTOR

(71) Applicant: A. Raymond et Cie., Grenoble (FR)

(72) Inventor: Justin Gauthier, Shelby Township, MI (US)

(73) Assignee: A. Raymond et Cie., Grenoble (FR)

( * ) Notice: Subject to any disclaimer, the term of this patent is extended or adjusted under 35 U.S.C. 154(b) by 738 days.

(21) Appl. No.: 15/884,639

(22) Filed: Jan. 31, 2018

(65) Prior Publication Data
US 2019/0234547 A1    Aug. 1, 2019

(51) Int. Cl.
*F16L 37/10* (2006.01)
*F16L 37/091* (2006.01)
*F16L 37/098* (2006.01)

(52) U.S. Cl.
CPC ........... *F16L 37/101* (2013.01); *F16L 37/091* (2013.01); *F16L 37/0985* (2013.01); *F16L 2201/10* (2013.01)

(58) Field of Classification Search
CPC ... F16L 37/101; F16L 37/091; F16L 37/0985; F16L 2201/10; F16L 37/12
See application file for complete search history.

(56) References Cited

U.S. PATENT DOCUMENTS

| | | |
|---|---|---|
| 4,632,436 A | 12/1986 | Kimura |
| 4,721,331 A | 1/1988 | Lemelshtrich |
| 4,856,823 A | 8/1989 | Heren |
| 5,090,747 A | 2/1992 | Kotake |
| 5,374,088 A | 12/1994 | Moretti et al. |
| 5,520,420 A | 5/1996 | Moretti |
| 6,082,779 A | 7/2000 | Lesser et al. |
| 6,086,119 A | 7/2000 | Haensel |

(Continued)

FOREIGN PATENT DOCUMENTS

| | | | |
|---|---|---|---|
| CA | 2812149 A1 * | 2/2013 | .......... F16L 37/0885 |
| CN | 104089123 A | 10/2014 | |

(Continued)

OTHER PUBLICATIONS

Machine assisted English translation of JP2006183833A obtained from https://patents.google.com/ on Sep. 12, 2019, 15 pages.

(Continued)

*Primary Examiner* — James M Hewitt, II
(74) *Attorney, Agent, or Firm* — Warner Norcross + Judd LLP

(57) ABSTRACT

A dual-latch system requiring two distinct and sequential operations to verify that a proper connection has been made is disclosed. In the first operation, the fluid line is installed into the quick connector and is attached. In the second operation, the fluid line is locked into the quick connector using a separate sliding lock latch. The connector assembly comprises a housing having an inner bore for receiving a portion of the fluid line, a spring latch having radially-spaced engaging bodies for engaging the raised upset or bead of the fluid line, and a sliding lock latch having spring release interference abutments. The sliding lock latch is movable from an unlocked position in which the abutments allow movement of the engaging bodies relative to the raised upset or bead to a locked position in which the abutments restrict movement of the engaging bodies to the raised upset or bead engaging position.

17 Claims, 22 Drawing Sheets

(56) References Cited

U.S. PATENT DOCUMENTS

| | | | |
|---|---|---|---|
| 6,089,616 | A | 7/2000 | Trede et al. |
| 6,139,214 | A | 10/2000 | Zirps et al. |
| 6,318,764 | B1 | 11/2001 | Trede et al. |
| 6,652,007 | B1 | 11/2003 | Hwang |
| 7,055,869 | B2 | 6/2006 | Malone |
| 7,128,347 | B2 | 10/2006 | Kerin |
| 7,547,048 | B2 | 6/2009 | Catlow |
| 7,566,077 | B2 | 7/2009 | Tsurumi |
| 7,802,822 | B2 | 9/2010 | Poder et al. |
| 7,823,930 | B2 | 11/2010 | Feger et al. |
| 7,866,711 | B2 | 1/2011 | Kerin et al. |
| 8,033,575 | B2 | 10/2011 | Tsurumi |
| 8,960,726 | B2 | 2/2015 | Nick et al. |
| 9,004,543 | B2 | 4/2015 | Bongiorni et al. |
| 9,523,453 | B2 | 12/2016 | Arnold et al. |
| 9,695,966 | B2 | 7/2017 | Lombardi, III et al. |
| 9,777,876 | B2 | 10/2017 | Kanerko et al. |
| 9,816,658 | B2 | 11/2017 | Ishizaka et al. |
| 9,822,914 | B2 | 11/2017 | Okazaki |
| 9,890,887 | B2 | 2/2018 | Barthel et al. |
| 10,167,983 | B2 | 1/2019 | Tomlinson |
| 10,247,340 | B2 | 4/2019 | Arnold et al. |
| 10,323,782 | B2 | 6/2019 | Hatanaka |
| 10,422,459 | B2 | 9/2019 | Jones et al. |
| 10,422,460 | B2 | 9/2019 | Kujawski, Jr. |
| 10,520,122 | B2 | 12/2019 | Nakashima |
| 10,808,872 | B2 * | 10/2020 | Chaupin ............. F16L 37/1225 |
| 2002/0180210 | A1 | 12/2002 | Martin-Cocher et al. |
| 2004/0036282 | A1 | 2/2004 | Rohde et al. |
| 2005/0179258 | A1 | 8/2005 | Brandt et al. |
| 2005/0218650 | A1 | 10/2005 | Pepe et al. |
| 2005/0225082 | A1 | 10/2005 | Dalle et al. |
| 2006/0165479 | A1 | 7/2006 | Lorenz |
| 2007/0040377 | A1 | 2/2007 | Moretti et al. |
| 2007/0236012 | A1 | 10/2007 | Kerin et al. |
| 2008/0007053 | A1 | 1/2008 | Kerin et al. |
| 2008/0136163 | A1 | 6/2008 | Okada |
| 2008/0315576 | A1 | 12/2008 | Moretti et al. |
| 2010/0019483 | A1 | 1/2010 | Bokuehn |
| 2010/0052313 | A1 | 3/2010 | Ishida et al. |
| 2010/0276924 | A1 | 11/2010 | Gillet et al. |
| 2012/0161435 | A1 | 6/2012 | Yamada et al. |
| 2014/0125051 | A1 | 5/2014 | Barthel et al. |
| 2015/0159793 | A1 | 6/2015 | Nagaya |
| 2016/0053930 | A1 | 2/2016 | Deplan |
| 2017/0067588 | A1 * | 3/2017 | Chaupin ............. F16L 37/0885 |
| 2017/0363237 | A1 | 12/2017 | Pepe et al. |
| 2019/0003626 | A1 | 1/2019 | Stieler |
| 2019/0331275 | A1 | 10/2019 | Kujawski, Jr. |

FOREIGN PATENT DOCUMENTS

| | | | | |
|---|---|---|---|---|
| CN | 104633360 | A | 5/2015 | |
| DE | 102004062887 | B3 | 10/2005 | |
| DE | 102010016260 | A1 | 10/2010 | |
| EP | 0826916 | A2 | 3/1998 | |
| EP | 1369634 | A1 * | 12/2003 | .......... F16L 37/1225 |
| EP | 2754941 | A2 | 7/2014 | |
| EP | 2988048 | A1 | 2/2016 | |
| FR | 2780765 | A1 | 1/2000 | |
| FR | 2910109 | A1 | 6/2008 | |
| FR | 2914043 | A1 | 9/2008 | |
| JP | 2006183833 | A | 7/2006 | |
| JP | 2007178003 | A | 7/2007 | |
| JP | 2013167303 | A | 8/2013 | |
| KR | 19990045970 | A | 6/1999 | |
| WO | 9901690 | A1 | 1/1999 | |
| WO | 2010035755 | A1 | 1/2010 | |
| WO | 201202678 | A2 | 1/2012 | |

OTHER PUBLICATIONS

Machine assisted English translation of JP2013167303A obtained from https://patents.google.com/ on Sep. 12, 2019, 10 pages.
Machine assisted translation of WO2010035755A1 obtained from https://patents.google.com on Sep. 26, 2019, 8 pages.
Machine assisted translation of JP2007178003A obtained from https://patents.google.com on Sep. 26, 2019, 7 pages.
Machine assisted translation of FR2910109A1 obtained from https://patents.google.com on Sep. 26, 2019, 6 pages.
Machine assisted translation of EP0826916A2 obtained from https://patents.google.com on Sep. 26, 2019, 5 pages.
Machine assisted translation of WO9901690A1 obtained from https://patents.google.com on Sep. 26, 2019, 6 pages.
Machine assisted translation of FR2780765A1 obtained from https://patents.google.com on Sep. 26, 2019, 9 pages.
Machine assisted translation of KR19990045970A obtained from https://patents.google.com on Sep. 26, 2019, 6 pages.
Machine assisted translation of FR2914043A1 obtained from https://patents.google.com on Sep. 26, 2019, 7 pages.
Machine assisted translation of DE102010016260A1 obtained from https://patents.google.com on Sep. 26, 2019, 12 pages.
Machine assisted translation of WO201202678A2 obtained from https://patents.google.com on Sep. 26, 2019, 7 pages.
Machine assisted translation of CN104633360A obtained from https://patents.google.com on Sep. 26, 2019, 6 pages.
Machine assisted translation of CN104089123A obtained from https://patents.google.com on Sep. 26, 2019, 7 pages.

* cited by examiner

DUAL-LATCH QUICK CONNECTOR

TECHNICAL FIELD

The disclosed inventive concept relates generally to a coupling for a fluid line. More particularly, the disclosed inventive concept relates to a fluid line connector that can be readily installed during the installation process and which provides two distinct and sequential operations. The first operation is the initial retention of the fluid line by a spring latch as it is inserted into the connector resulting in audible attachment confirmation. The second operation is an operator-manipulated sliding lock latch or locker which, when engaged, prevents the unintended release of the line from the connector. The sliding lock latch, if moved into its locked position prior to insertion of the fluid line, also prevents later insertion of the line.

BACKGROUND OF THE INVENTION

In many industries it is necessary to connect a first fluid-carrying line to a second fluid-carrying line. This is often the case in the automotive industry where fluids such as gasoline, oil, coolants and brake fluid must be carried between a first location on the vehicle and a second location on a vehicle. These two locations are often relatively remote from one another. It is important that the lines carrying these fluids be easy to install, robust, and leak-proof.

The point of the fluid line that carries the highest risk of leaking is the point of connection. Aware of this challenge, designers of fluid line connectors endeavor to build in a robust connector that, when properly installed, carries fluid without leaking. An early response to meeting the requirements that the connection be sturdy and leak-proof included threaded fasteners that connected one line to the other.

While assuring a proper leak-proof seal when correctly installed, threaded fasteners require that the installer typically use two wrenches, an exercise that requires a considerable amount of assembly time. In an effort to reduce the needed time to connect a first fluid line to a second fluid line, the quick connector was developed. The modern quick connector is installed between two fluid lines. Attachment of at least one of the fluid lines can be made easily by the simple insertion of the line into the quick connector. A locking arrangement incorporated into the quick connector retains the fluid line by engagement with a radially enlarged upset or bead formed on the fluid line. In some instances, the fluid line can be released from the quick connector by a release button incorporated into the quick connector. Known quick connectors often readily join one fluid line to another without leakage.

While providing an adequate solution for many purposes, known quick connector designs have certain limitations. For example, while providing a relatively sure lock of the fluid line in the connector upon initial attachment, there is no known practical arrangement for verifying that the tube is in its correct position and will stay there after installation and during vehicle operation.

Accordingly, and as is the case in many industries, known approaches to joining a first fluid line to a second fluid line may not provide all of the features desired by a manufacturer as standards for correct fluid line fastening continue to evolve. An improved connector for readily fastening a first fluid line to another fluid line that provides verification that a proper and fluid-tight connection has been achieved remains wanting.

SUMMARY OF THE INVENTION

The disclosed inventive concept overcomes the problems associated with known quick connector arrangements for fluid lines by providing a dual-latch system requiring two distinct and sequential operations to verify that a proper connection has been made. In the first operation, the fluid line is installed into the quick connector. Installation is verified to the installer by an audible sound that confirms that a proper connection has been made with a spring latch, the primary point of attachment. In the second operation, the fluid line is locked into the quick connector using a separate sliding lock latch. According to this arrangement, once the sliding lock latch is in its locked position, the spring latch cannot be used to release the fluid line. In the event that the separate sliding lock latch is moved to its locked position prior to installation of the fluid line, insertion of the fluid line is prevented.

The connector assembly comprises a housing having an inner bore for receiving a portion of the fluid line, a spring latch having radially-spaced engaging bodies for engaging the raised upset or bead of the fluid line, and a sliding lock latch having spring release interference abutments. The inner bore of the housing defines a fluid line insertion axis. The spring latch and the sliding lock latch are substantially aligned along a vertical axis that is perpendicular to the insertion axis of the housing.

The spring latch further includes a first spring web, a second spring web, a release button, and a joint. The first spring web connects the release button and the engaging bodies. The second spring web connects the joint and the engaging bodies.

The engaging bodies of the spring latch are radially movable between a raised upset or bead engaging position and a raised upset or bead passing position. The sliding lock latch is movable from an unlocked position in which the abutments allow movement of the engaging bodies relative to the raised upset or bead to a locked position in which the abutments restrict movement of the engaging bodies to the raised upset or bead engaging position.

The engaging bodies are movable radially inward to the raised upset or bead engaging position and outward to the raised upset or bead passing position. The spring release interference abutments restrict the radially outward movement of the engaging bodies when the sliding lock latch is in its locked position.

The sliding lock latch includes a cover portion from which the spring release interference abutments extend. The sliding lock latch further includes a pair of spaced apart latching arms that may interlock with the housing to retain the sliding lock latch in its locked position.

Fluid line interlock arms also extend from the cover portion. The fluid line interlock arms are engaged with the raised upset or bead of the fluid line when the sliding lock latch is in its locked position if an insertion part is present. If no fluid line is present and the sliding lock latch is moved to its locked position, the fluid line interlock arms prevent the fluid line from being inserted into the housing.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
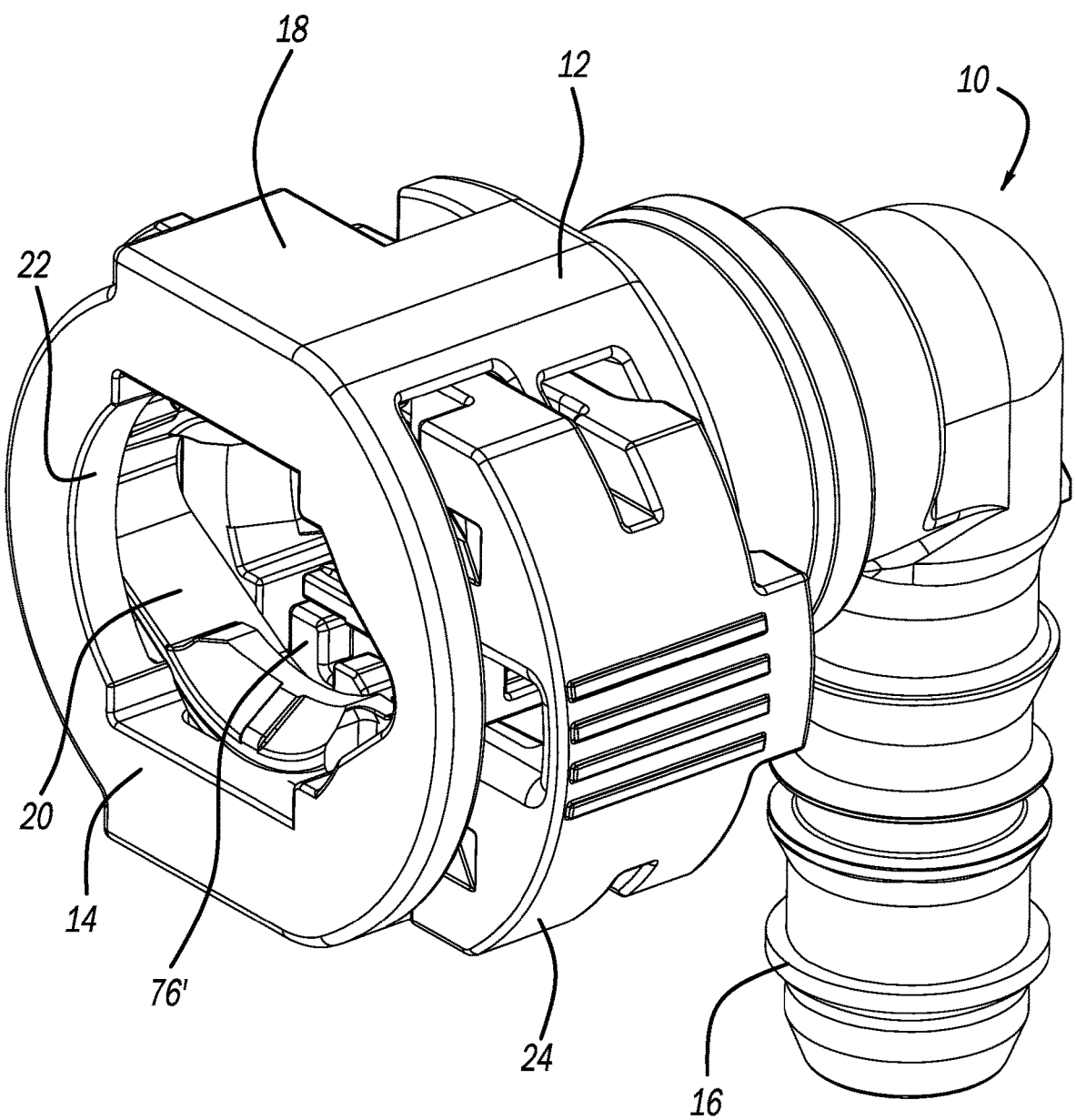
FIG. 1 is a perspective view of the dual-latch quick connector of the disclosed inventive concept.

As those of ordinary skill in the art will understand, various features of the embodiments illustrated and described with reference to any one of the figures may be combined with features illustrated in one or more other figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

The figures illustrate a dual-latch quick connector according to the disclosed inventive concept. The dual-latch quick connector illustrated in the accompanying figures and discussed in relation thereto is suitable for a wide variety of applications that include and go beyond the automotive sector. Particularly, the dual-latch quick connector may find utility in any environment in which a first fluid line is to be connected to a second fluid line. Such environments include, without limitation, airplanes, locomotives and ships. Other environments include factory, commercial and residential areas.

The dual-latch quick connector of the disclosed inventive concept is illustrated as having an L-shaped body. It is to be understood that the body of the dual-latch quick connector of the disclosed inventive concept may alternatively be linear in shape or may be virtually of any other shape as needed for adaptation to a particular purpose. Furthermore, the illustrated dual-latch quick connector illustrates a body having a first end in the form of a quick connector arrangement and a second end in the form of a stem for attachment to a hose or any other type of tube. Alternatively, the dual-latch quick connector of the disclosed inventive concept may incorporate quick connector arrangements at both ends. Accordingly, the dual-latch quick connector as illustrated is intended as being suggestive but not limiting.

Installation is in two separate and sequential operations that involve a primary latch or spring latch and a secondary latch verifier or sliding lock latch. In the first operation, the installer inserts the fluid line to be connected into the dual-latch quick connector of the disclosed inventive concept until an audible "click" is heard, thereby verifying that the fluid line is initially locked into place in the spring latch of the dual-latch quick connector. In the second operation, the installer moves the sliding lock latch or lock verifier into position to prevent the inadvertent release of the fluid line from the dual-latch quick connector by inhibiting the release operation of the spring latch. Once the fluid line has been secured by the spring latch, the fluid line is fixed to the dual-latch quick connector and cannot be released without the operator applying pressure to the spring latch release button. However, once the operator moves the sliding lock latch into its locked position, the spring latch cannot be opened.

Figure 2:
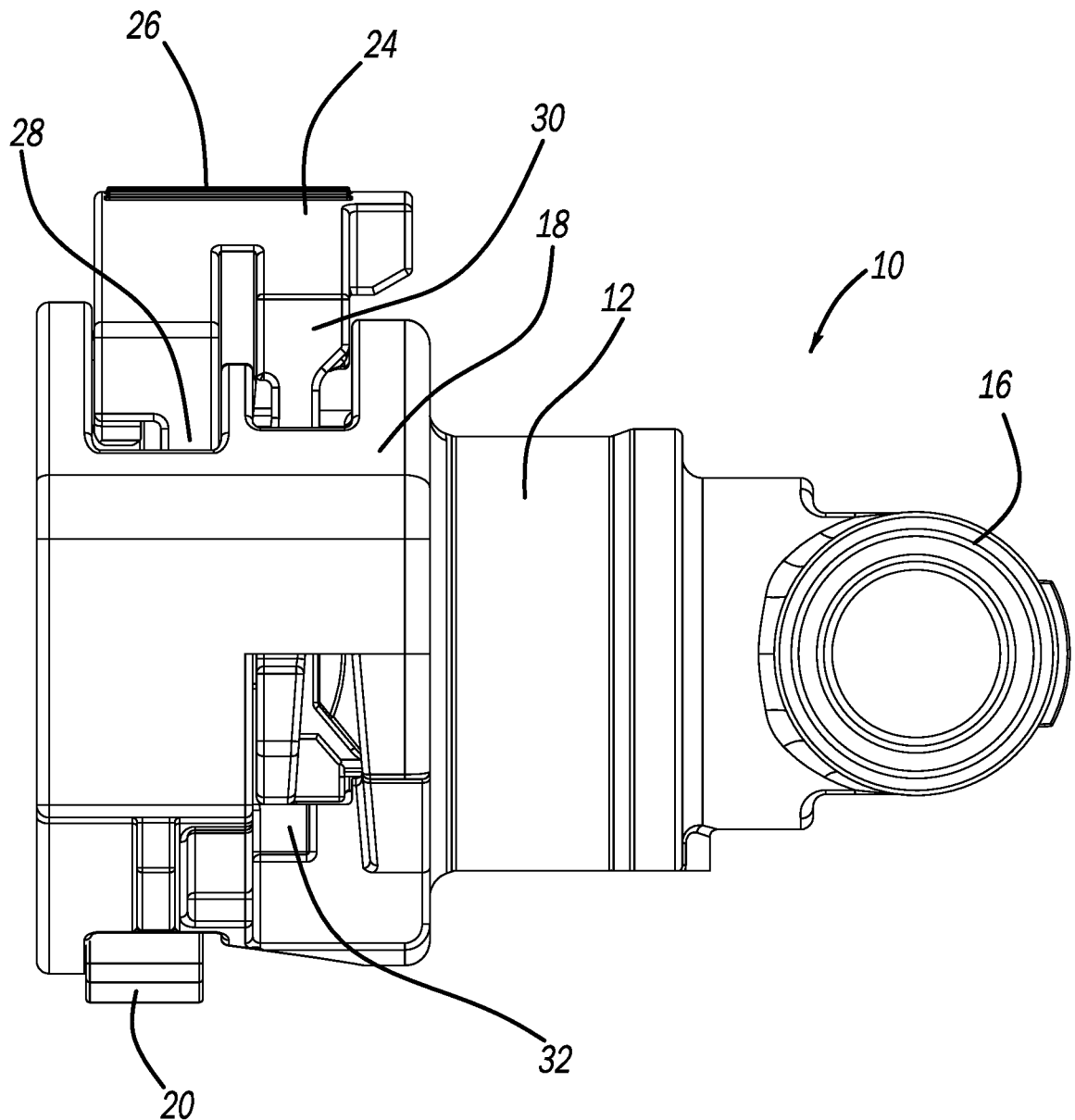
FIG. 2 is an underside view of the dual-latch quick connector of FIG. 1.

FIGS. 1 and 2 illustrate an exemplary quick connector assembly for establishing fluid communication between a first fluid line and a second fluid line. The quick connector, generally illustrated as 10, includes a housing 12 having an outer periphery and a fluid line input end 14 for receiving and holding a fluid line or insertion part and a stem 16. The housing 12 may be composed of any material, although a durable, chemical-resistant and lightweight polymerized material is preferred. A tube, a hose or any other type of fluid-carrying line (not shown) is fixedly attached to the stem 16. The housing 12 further includes a connector collar 18.

Referring specifically to FIG. 1 in which a perspective view of the dual-latch quick connector 10 is shown, a portion of a spring latch 20 is illustrated substantially within the connector collar 18. The spring latch 20 is axially spaced from the fluid line input end 14. An insertion part axial bore 22 extends inward of the housing 12 from the fluid line input end 14.

A sliding lock latch 24 is partially illustrated in its unlocked and raised position relative to the connector collar 18. The axis of the spring latch 20 and the axis of the sliding lock latch 24 are substantially aligned along a vertical axis that is perpendicular to the insertion part axial bore 22 of the housing 12.

Referring specifically to FIG. 2, an underside view of the dual-latch quick connector 10 is shown, the sliding lock latch 24 is again illustrated in its unlocked and raised position relative to the connector collar 18. The sliding lock latch 24 includes a cover portion 26 from which extend a pair of spaced apart retaining arms of which a spring release interference abutment 28 is shown. Also extending from the cover portion 26 is a pair of spaced apart latching arms of which a latching arm 30 is shown. Latching projections are formed on the housing 12 to which the latching arms may be attached. One such latching projection 32 is shown. As illustrated, the latching arm 30 is unlatched relative to the latching projection 32.

Figure 3:
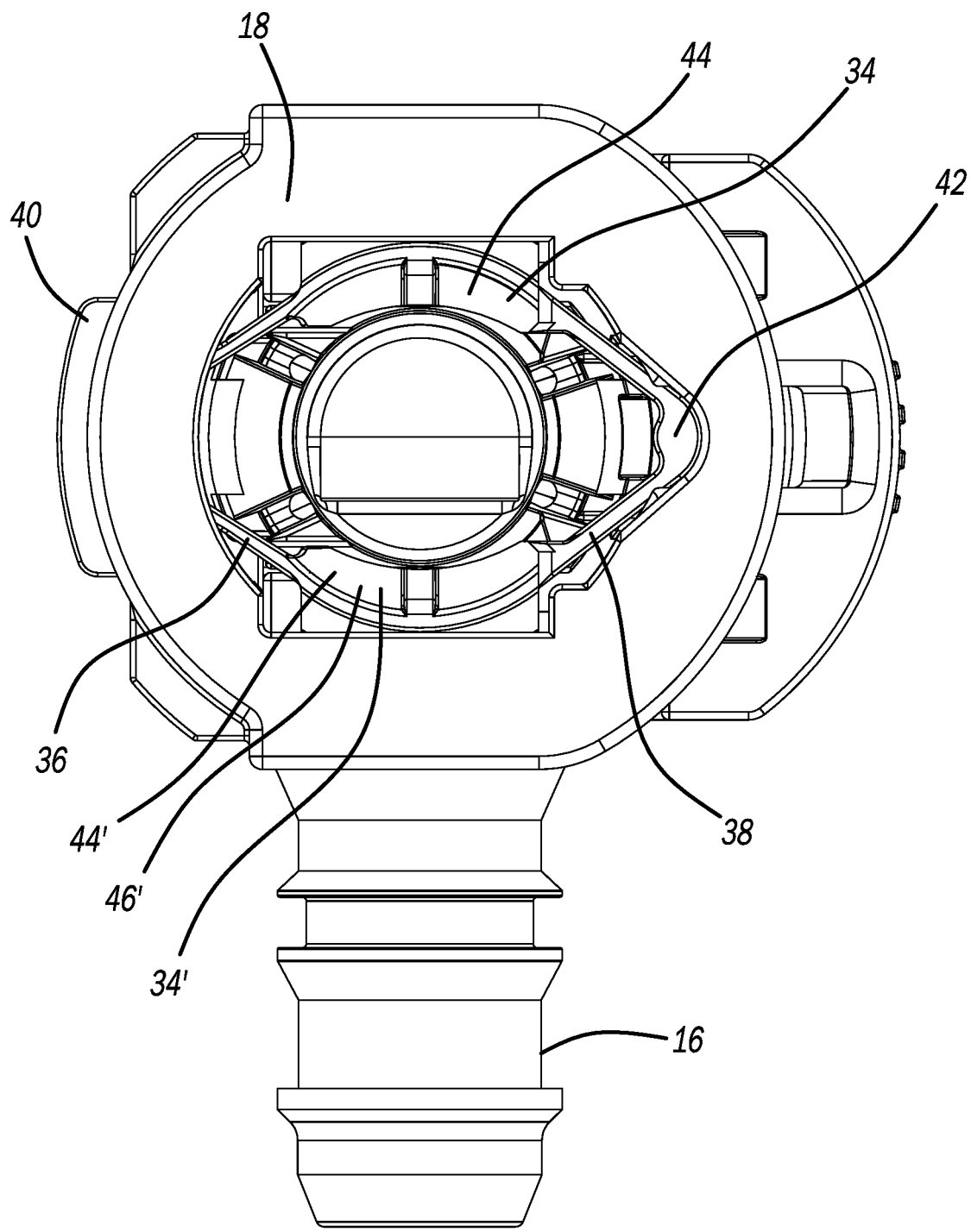
FIG. 3 is a view of the fluid line insertion end of the dual-latch quick connector of FIG. 1 in which the sliding lock latch is shown in its pre-locked position.
Figure 4:
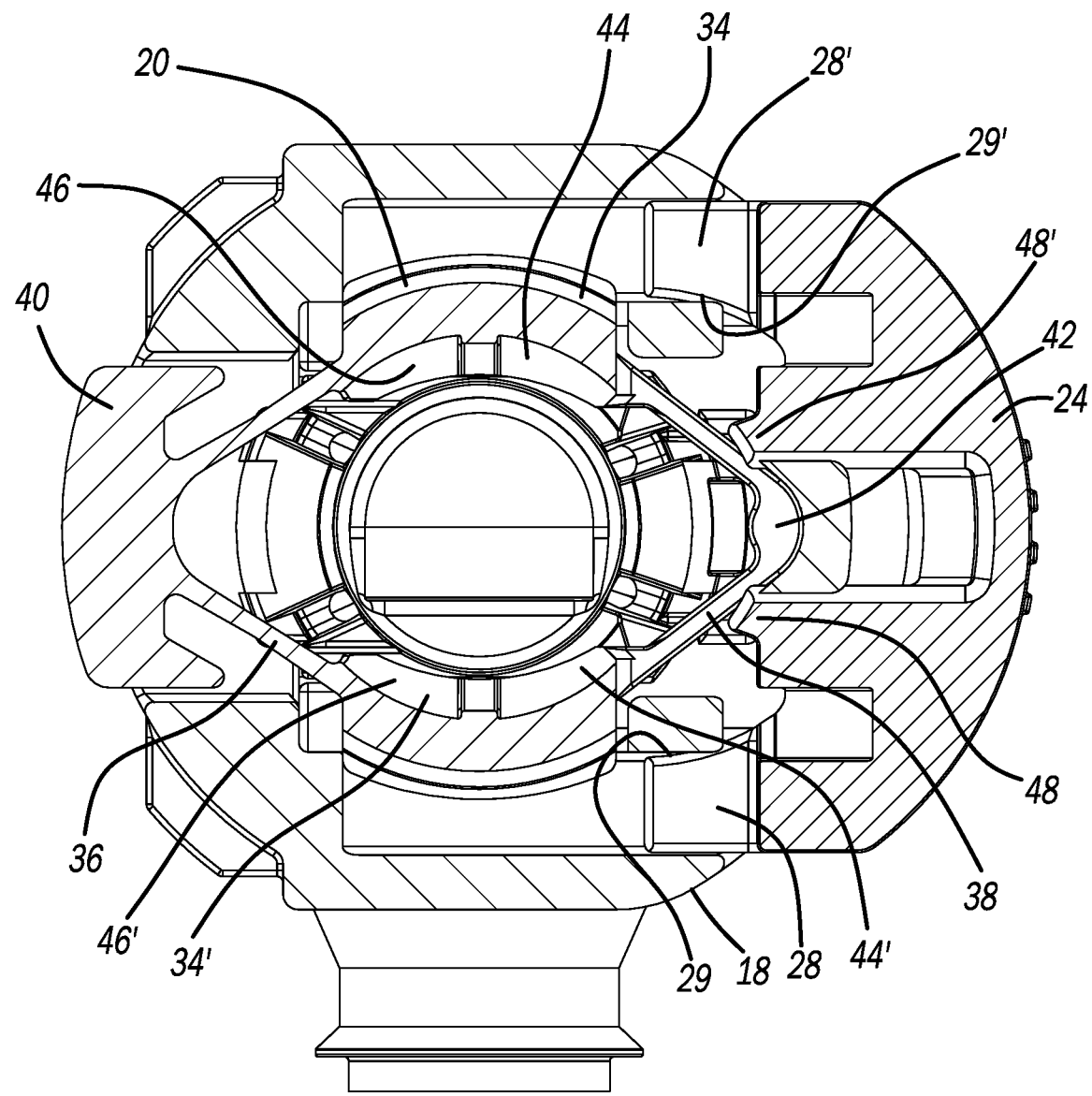
FIG. 4 is a view of the fluid line insertion end of the dual-latch quick connector of FIG. 1 similar to that of FIG. 3 but illustrating the top layer of the quick connector housing insertion end having been removed to reveal the spring latch and the sliding lock latch with the sliding lock latch shown in its pre-locked position.

FIGS. 3 and 4 illustrate two different end views of the dual-latch quick connector 10. These figures show the spring latch 20 in its unstressed state without a fluid line having been inserted. The spring latch 20 includes a pair of radially spaced fluid line engaging bodies or expansion-restricting surfaces 34 and 34'. The engaging bodies 34 and 34' are attached to one another at their ends via a first spring web 36 and a second spring web 38. The first spring web 36 is a V-shape and includes at its apex a release button 40 that extends through the connector collar 18. The second spring web 38 is also a V-shape and includes a joint 42 formed at its apex.

The engaging body 34 includes a ramped surface 44 having a leading edge 46. The engaging body 34' includes a ramped surface 44' having a leading edge 46'. The ramped surfaces 44 and 44' are formed on the fluid-line receiving side of the engaging bodies 34 and 34' respectively and are directed radially inwards. The opposite sides of the ramped surfaces 44 and 44' are substantially flat and are adapted to retain the raised upset of the fluid line after it has been pushed into place, thereby holding the fluid line in place. The ramped surfaces 44 and 44' in combination with the spring webs 36 and 38 assist in allowing the raised upset of the fluid line being attached to pass. The leading edges 46 and 46' are opposed to one another and are shaped generally in the form of an arc of a circle. The diameter of the circle's arc is approximately equal to the outer diameter of the raised upset of the fluid line being attached. The engaging body 34 further includes a sliding lock latch lock interface 47 and the engaging body 34' further includes a sliding lock latch lock interface 47'.

As illustrated particularly in FIG. 4, the sliding lock latch 24 includes the spring release interference abutment 28 and a spring release interference abutment 28'. The spring release interference abutments 28 and 28' extend from the cover portion 26. An interference abutment face or expansion-restricting surface 29 is formed on the spring release interference abutment 28 and an interference abutment face or expansion restricting surface 29' is formed on the spring release interference abutment 28'. Also extending from the cover portion 26 are fluid line interlock arms 48 and 48'.

Figure 5:
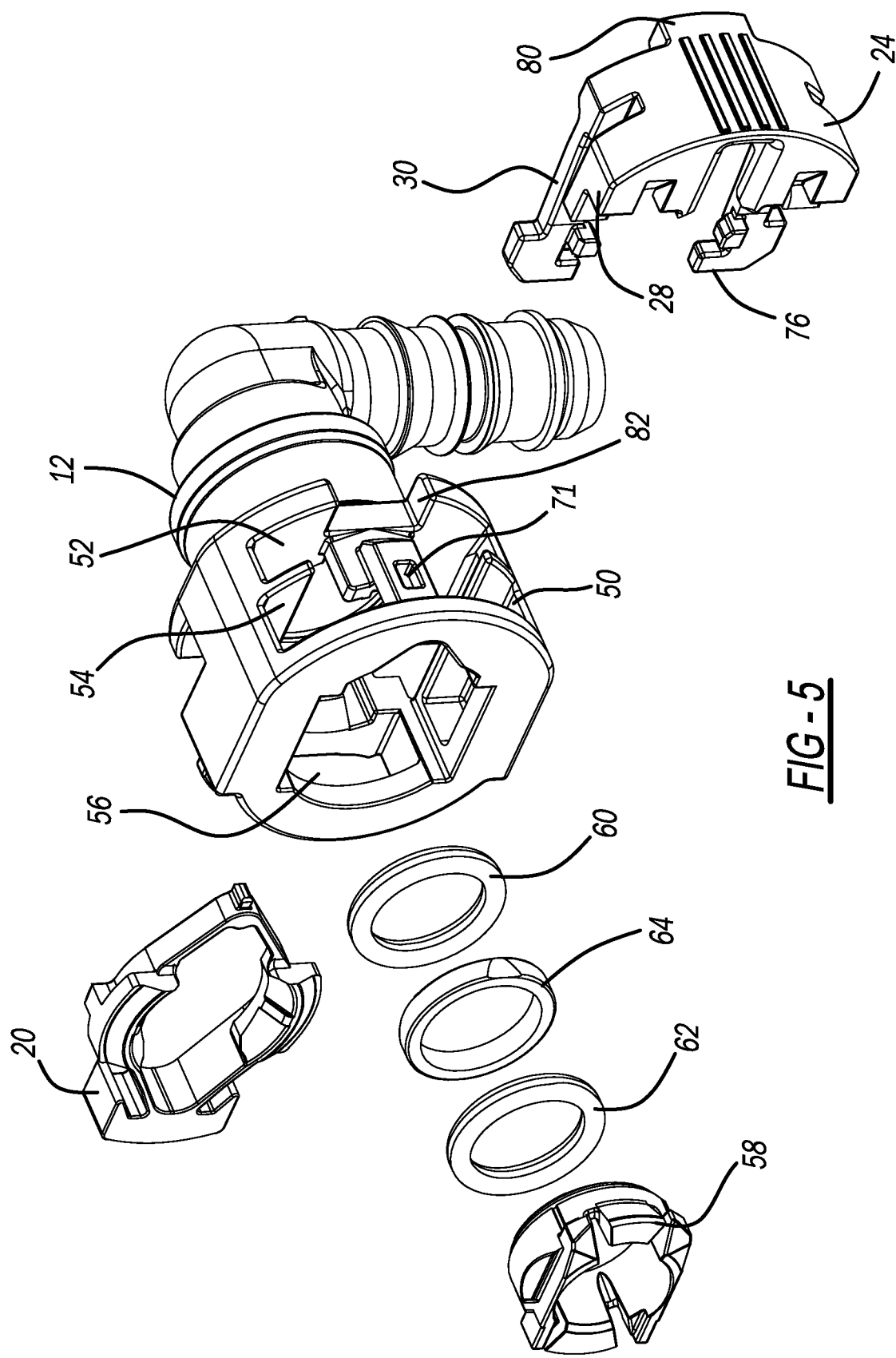
FIG. 5 is an exploded view of the dual-latch quick connector of FIG. 1.

The components of the dual-latch quick connector 10 are illustrated in FIG. 5 which is an exploded view of the assembly. The connector collar 18 of the housing 12 includes a sliding lock latch receiving slot 50 having a latching arm channel 52 and a retaining arm channel 54. Formed in the opposite side of the connector collar 18 is a spring latch receiving slot 56.

Figure 6:
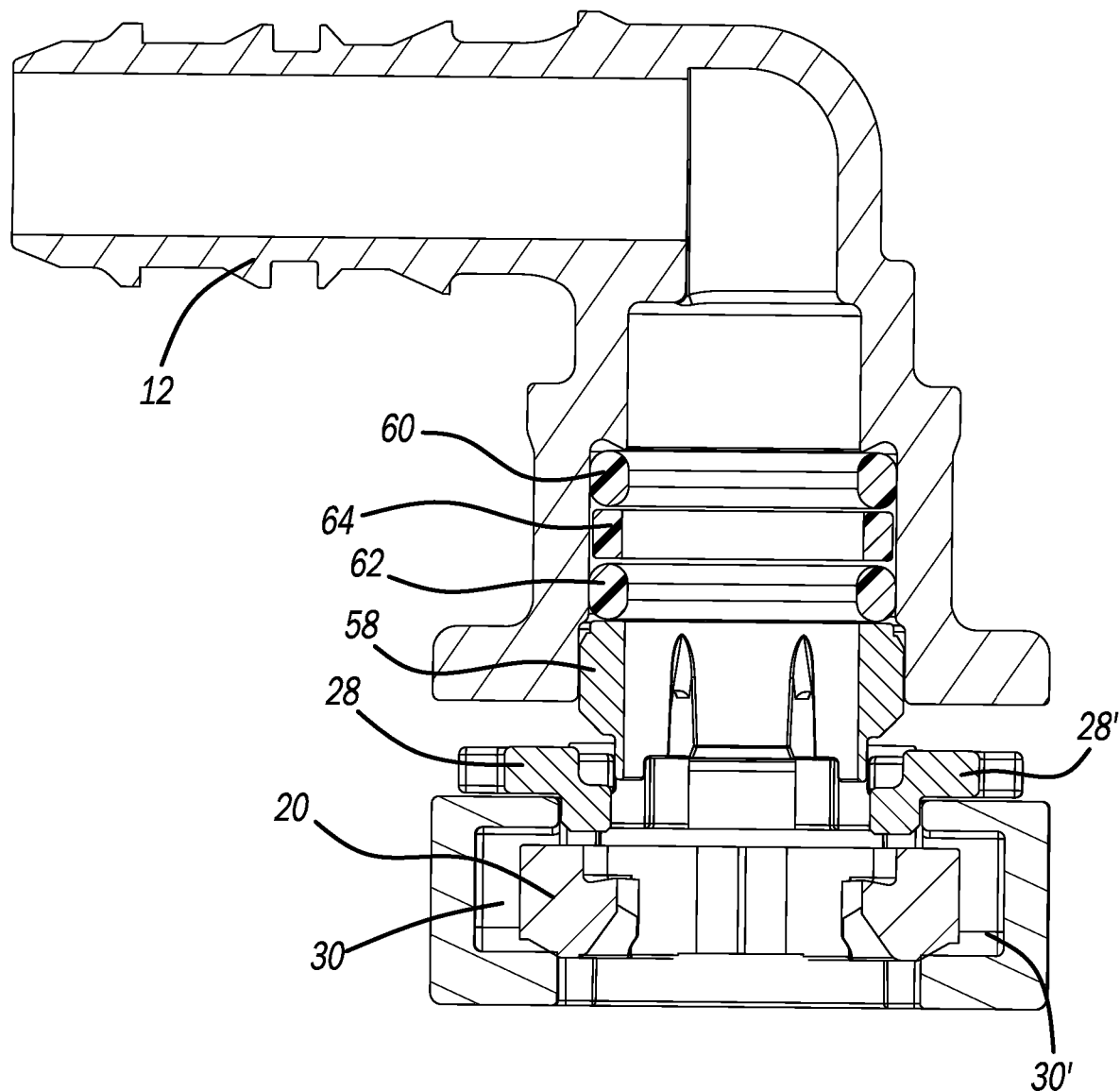
FIG. 6 is a sectional view of the dual-latch quick connector of FIG. 1.

The sealing arrangement of the dual-latch quick connector is illustrated in exploded view in FIG. 6. With reference thereto, the seal lock washer 58 is fixed within the housing 12 to retain sealing members and to guide the fluid line into the dual-latch quick connector. The sealing members function to prevent leakage of fluid from the joint formed between the quick connector and the fluid line. A non-limiting seal arrangement includes a primary O-ring 60, a secondary O-ring 62, and a spacer 64 positioned between the primary O-ring 60 and the secondary O-ring 62. The primary O-ring 60 is the first and main barrier against the fluid and is compressed by the fluid line against the housing 12. The primary O-ring is chemical resistant. The secondary O-ring 62 is the second barrier against the fluid and is the first barrier against air. It is also compressed by the fluid line against the housing. The secondary O-ring is not only chemical resistant but is also air resistant. The spacer 64 separates the primary O-ring 60 from the secondary O-ring 62 and also functions as a guide for the fluid line.

Figure 7:
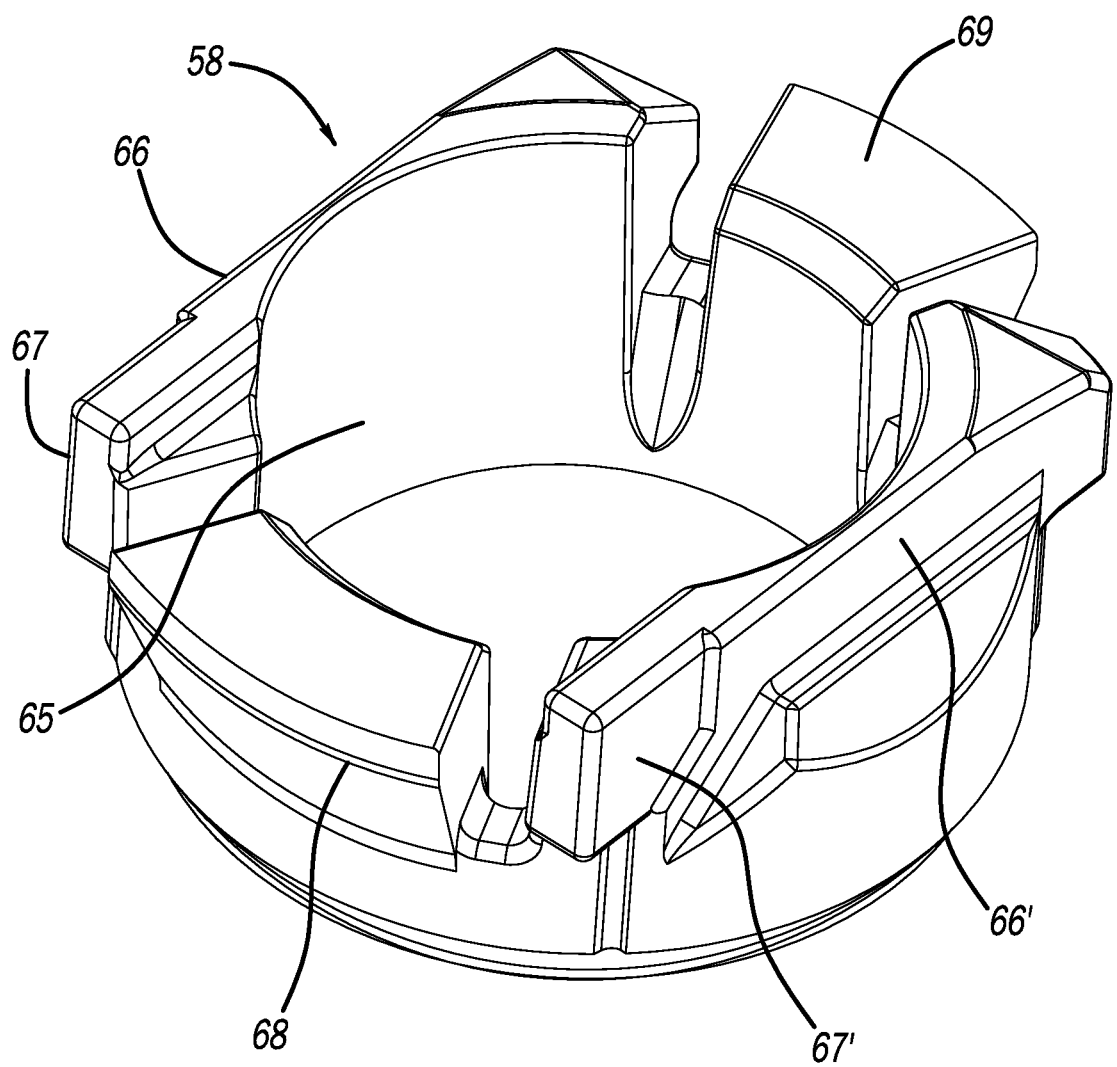
FIG. 7 is a perspective view of the O-ring lock washer incorporated into the dual-latch quick connector of FIG. 1.

The seal lock washer 58 is illustrated in perspective view in FIG. 7. The seal lock washer 58 includes a fluid-line passing bore 65 and a rail 66 and a rail 66'. The rail 66 includes a recessed interference portion 67 and the rail 66' includes a recessed interference portion 67'. The seal lock washer 58 further includes a housing engagement arm 68 and a housing engagement arm 69. The seal lock washer 58 may be made of any number of rigid and fluid-proof materials, including without limitation a polymerized material.

Figure 8:
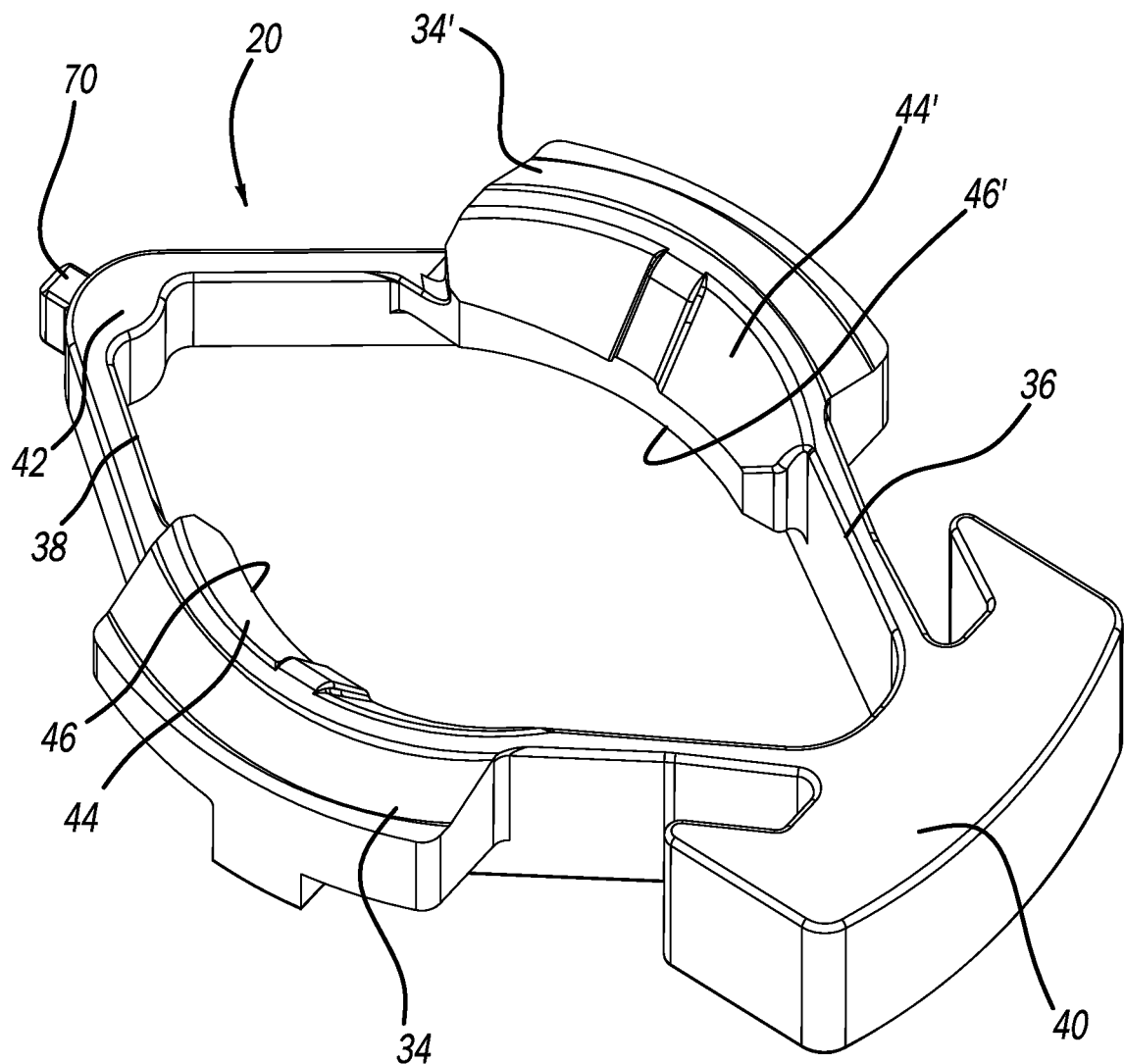
FIG. 8 is a perspective view of the spring latch incorporated into the dual-latch quick connector of FIG. 1 taken from the first side.
Figure 9:
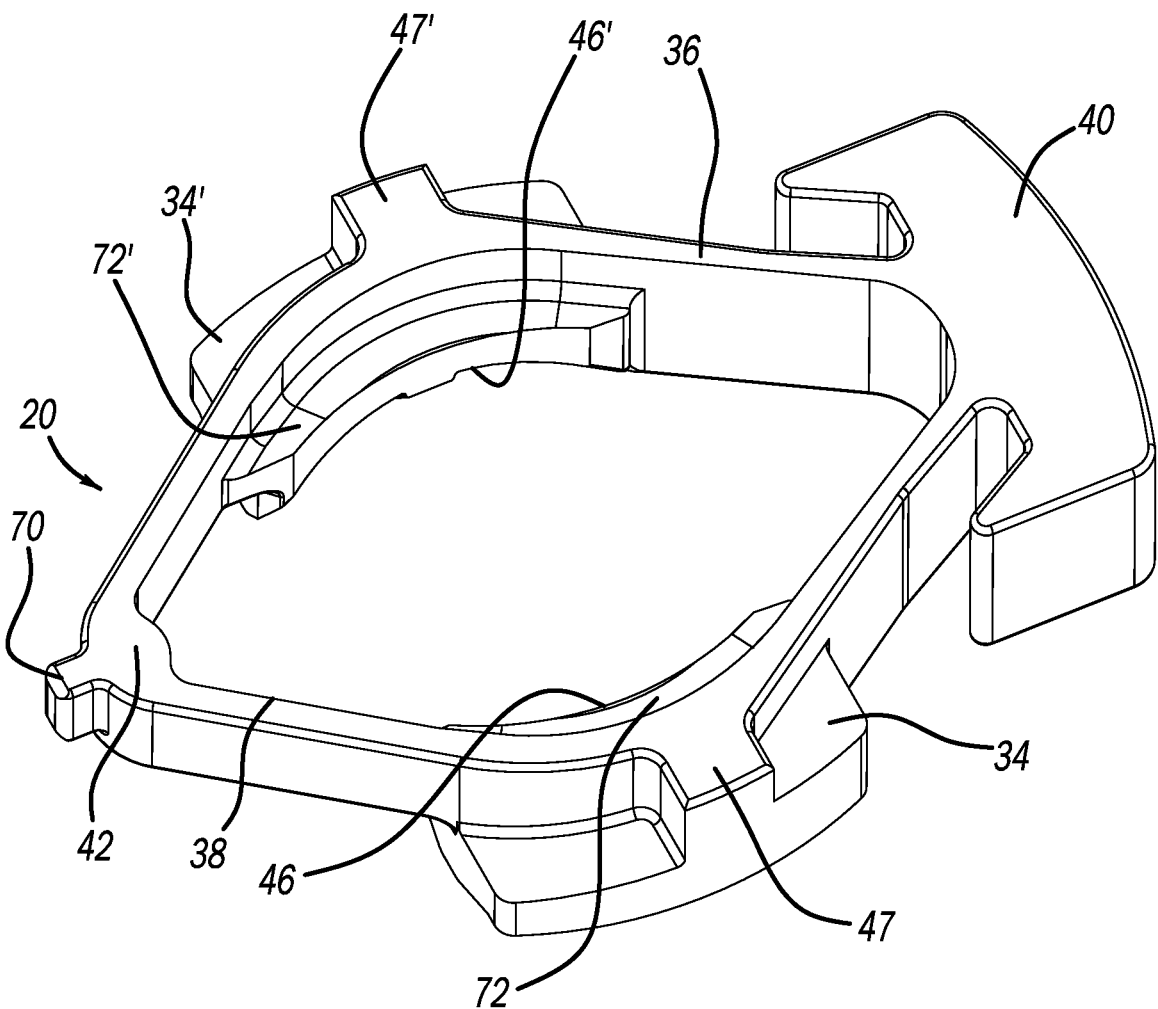
FIG. 9 is a perspective view of the spring latch incorporated into the dual-latch quick connector of FIG. 1 taken from the second side.

The spring latch 20 is illustrated in opposite perspective views in FIGS. 8 and 9. The configuration of the ramped surfaces 44 and 44' formed on the front sides of the radially spaced fluid line engaging bodies 34 and 34' respectively are particularly shown in FIG. 8. Also illustrated in both FIGS. 8 and 9 is a spring latch locator pin 70 formed on the web joint 42 and extending therefrom. The spring latch locator pin 70 fits into a locator pin aperture 71 (illustrated in FIG. 5) formed in the housing 12 at the base of the spring latch receiving slot 56.

As noted, the spring latch 20 functions to initially allow passage of the raised upset or bead formed on the fluid line and then to retain the fluid line within the housing 12. As illustrated in FIG. 9, a pair of fluid line retaining shoulders 70 and 72 is formed on the backsides of the radially spaced fluid line engaging bodies 34 and 34' respectively. The fluid line retaining shoulders 70 and 70' retain the fluid line within the housing 12 by capturing and holding the raised upset or bead formed on the fluid line as will be described below.

Figure 10:
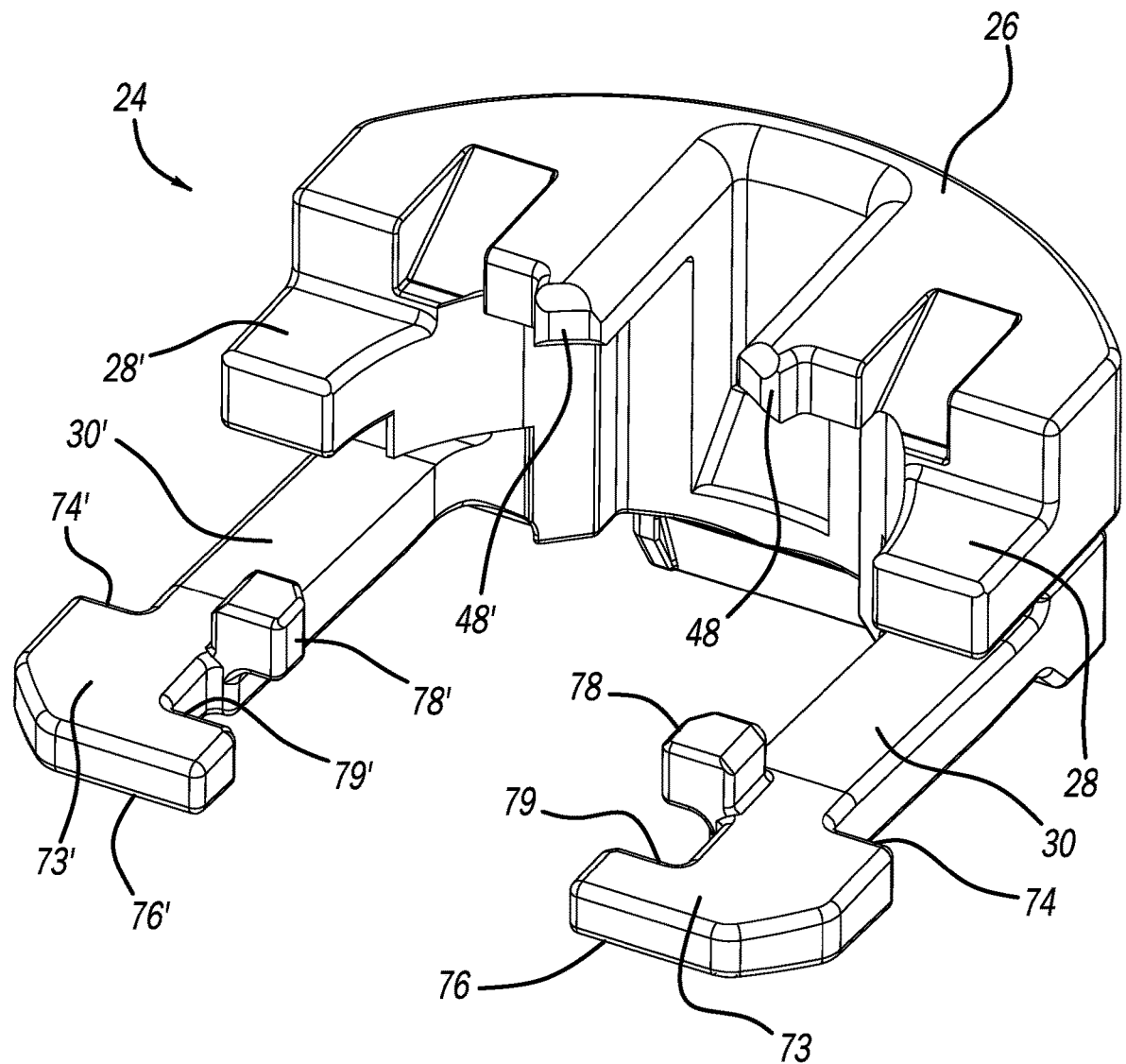
FIG. 10 is a perspective view of the sliding lock latch incorporated into the dual-latch quick connector of FIG. 1 taken from the first side.
Figure 11:
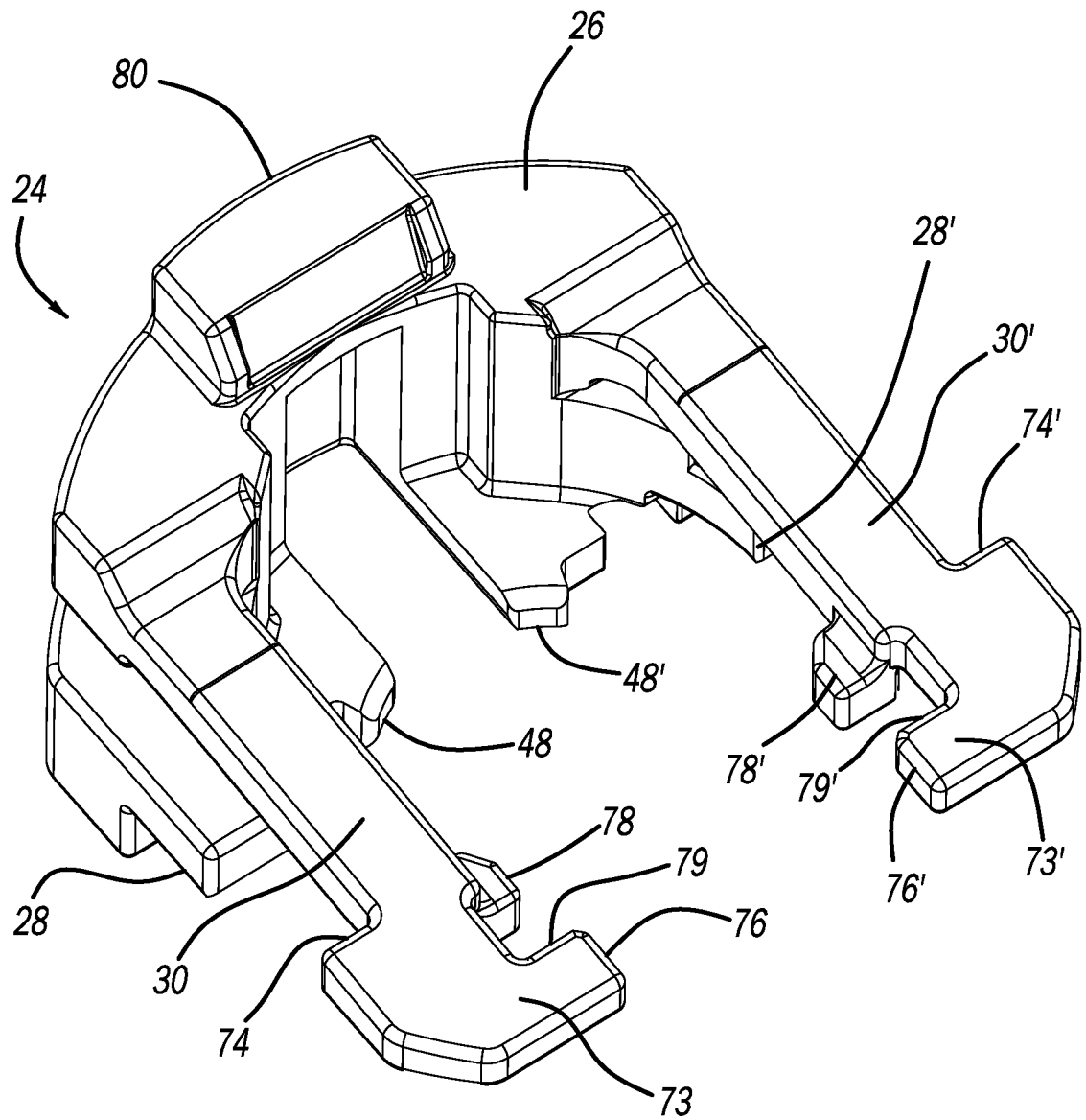
FIG. 11 is a perspective view of the sliding lock latch incorporated into the dual-latch quick connector of FIG. 1 taken from the second side.

The sliding lock latch 24 is illustrated in opposite perspective views in FIGS. 10 and 11. The configuration of the latching arms 30 and 30' is illustrated and includes a foot 73 formed on the distal end of the latching arm 30 and a foot 73' formed on the distal end of the latching arm 30'. The foot 73 includes a housing release prevention hook 74 and the foot 73' includes a housing release prevention hook 74'. The housing release prevention hooks 74 and 74' prevent removal of the sliding lock latch 24 from the sliding lock latch receiving slot 50.

A blocker 76 for engaging the interference portion 67 of the lock washer 58 is formed at the end of the foot 73. A blocker 76' for engaging the interference portion 67' of the lock washer 58 is formed at the end of the foot 73'. The blockers 76 and 76' engage their respective interference portions 67 and 67' when the sliding lock latch 24 is in its unlocked position.

In addition, a sliding lock latch locking tab 78 is formed at the end of the latching arm 30 adjacent the foot 73. A sliding lock latch locking tab 78' is formed at the end of the latching arm 30' adjacent the foot 73'. A gap 79 for capturing and holding the latching projection formed on the housing is formed between the blocker 76 and the sliding lock latch locking tab 78. A gap 79' for capturing and holding the latching projection formed on the housing is formed between the blocker 76' and the sliding lock latch locking tab 78'. Accordingly, the blocker 76 and the sliding lock latch locking tab 78 work in tandem with the blocker 76' and the sliding lock latch locking tab 78' to fix the sliding lock latch 24 in its locked position as described below with reference to FIGS. 20-22.

A sliding lock latch alignment arm 80 extends from the side of the cover portion 26 of the sliding lock latch 24. The sliding lock latch alignment arm 80 assures alignment of the sliding lock latch 24 relative to the housing 12 by being positioned into a sliding lock latch alignment arm slot 82 formed in the housing 12 (shown in FIG. 5) upon movement of the sliding lock latch 24 into its locked position.

The dual-latch quick connector 10 and its components are shown in isolation in FIGS. 1 through 11. Thus illustrated, the dual-latch quick connector 10 is shown in several of the figures in its pre-connected condition in which the sliding lock latch 24 is partially extended from the housing 12 in its unlocked position.

FIGS. 12 through 22 illustrate the dual-latch quick connector 10 relative to a fluid line or insertion part 90. The fluid line 90 may be composed of any of several materials, including without limitation a metal such as steel. The fluid line 90 includes a lead end 92 for insertion into the fluid line input end 14. The fluid line 90 further includes a raised upset or bead 94 for initial engagement with the dual-latch quick connector 10. The raised upset or bead 94 may be any of several dimensions including, without limitation, 9.49 MEF. Other dimensions, such as those specified in SAE J2044 of SAE International (incorporated by reference), may also be suitable.

Figure 12:
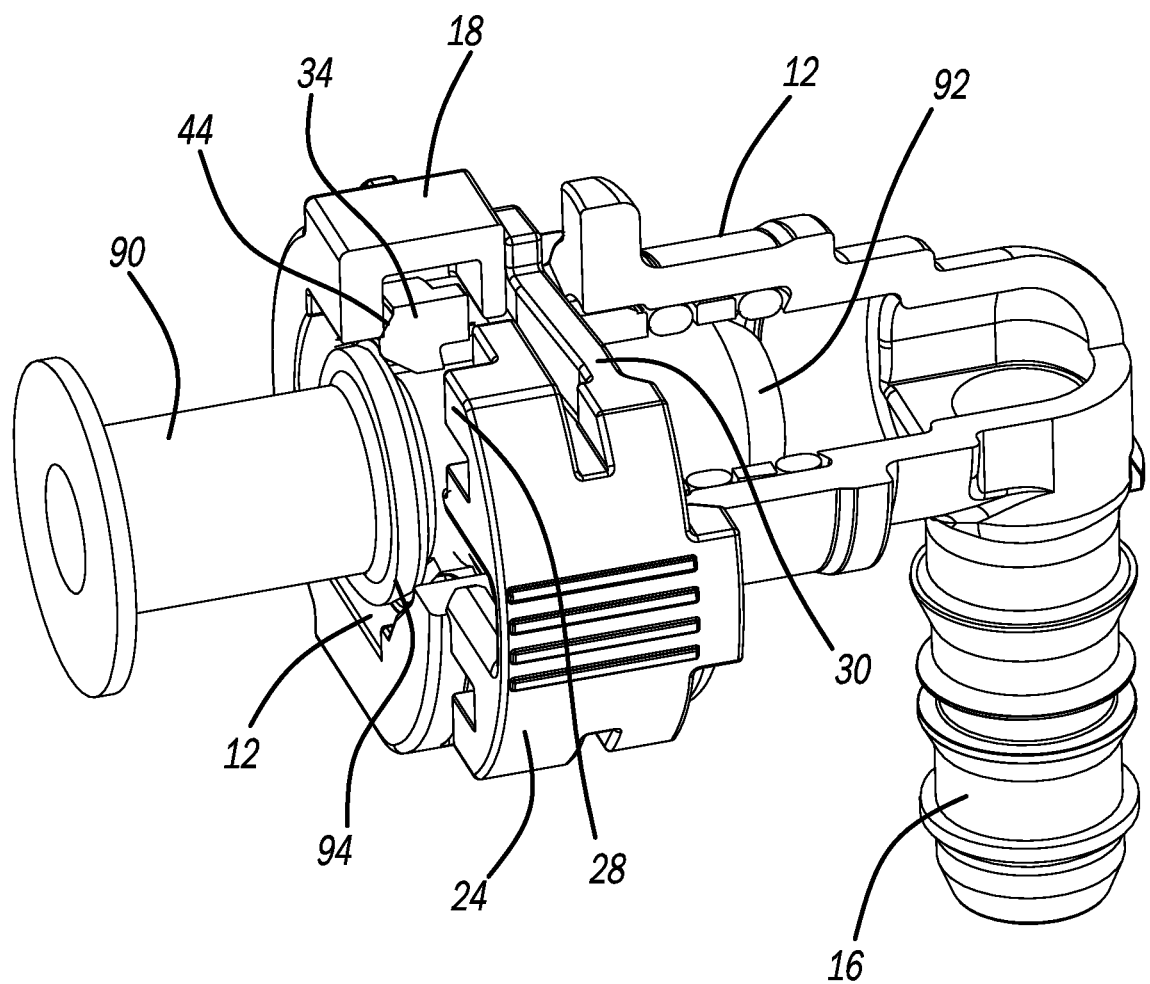
FIG. 12 is a perspective view of the dual-latch quick connector of FIG. 1 shown in partial section upon initial, pre-engaged insertion of a fluid line therein.
Figure 13:
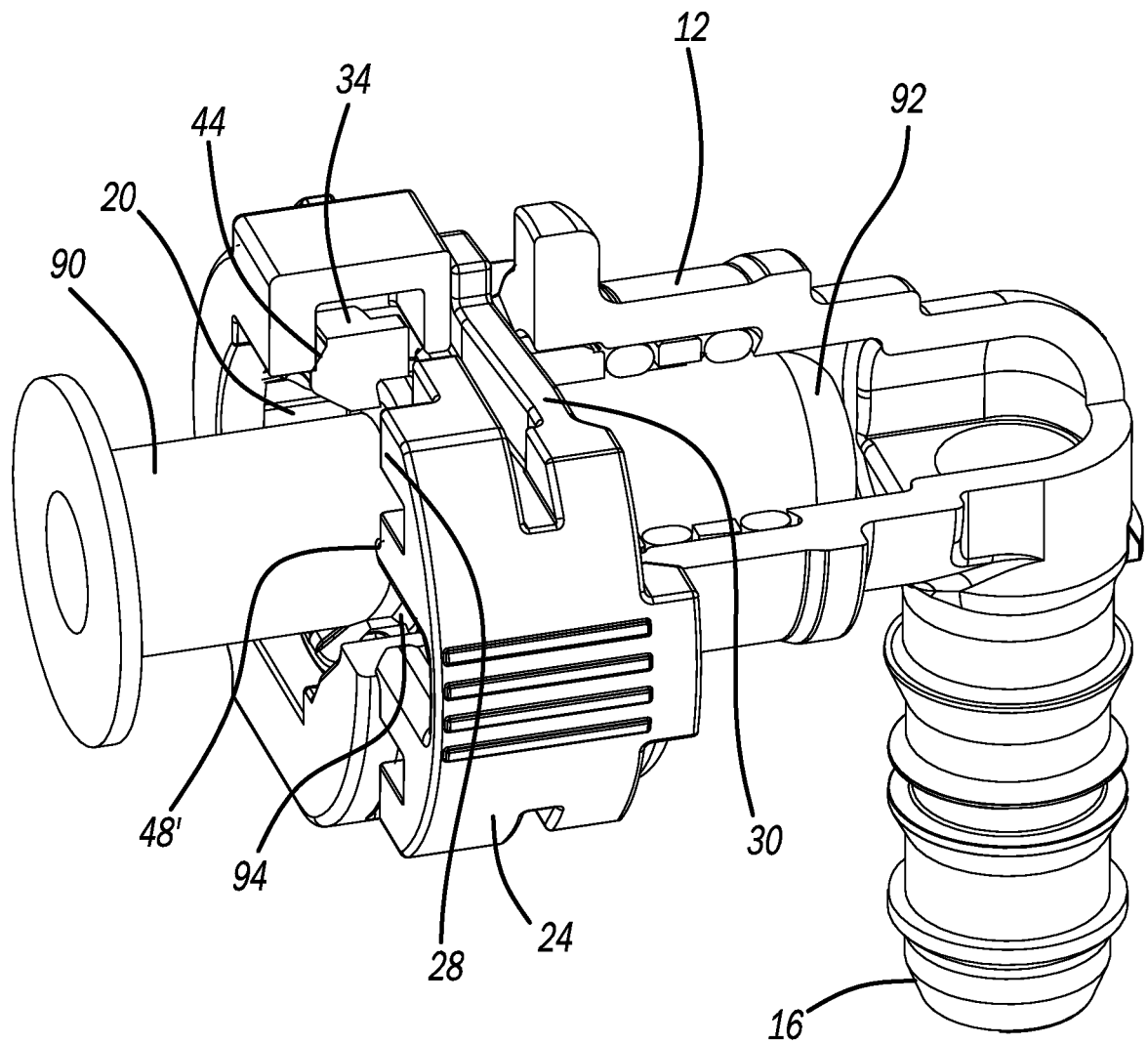
FIG. 13 is a first perspective view of the dual-latch quick connector of FIG. 1 shown in partial section upon insertion of a fluid line therein with the raised upset of the fluid line captured by the spring latch but prior to engagement by the sliding lock latch.
Figure 14:
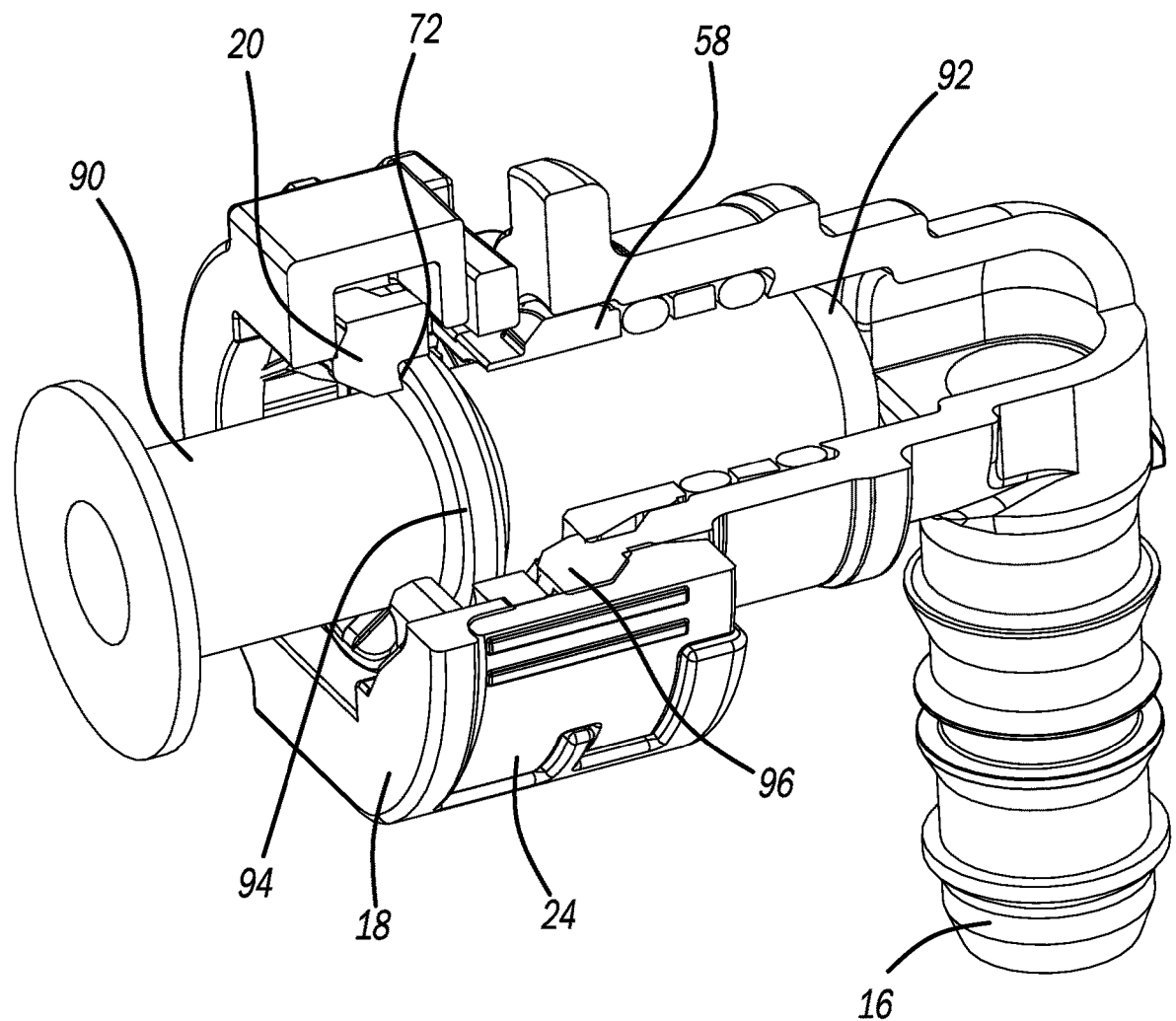
FIG. 14 is a second perspective view of the dual-latch quick connector of FIG. 1 shown in partial section upon insertion of a fluid line therein with the raised upset of the fluid line captured by the spring latch but after engagement by the sliding lock latch.
Figure 15:
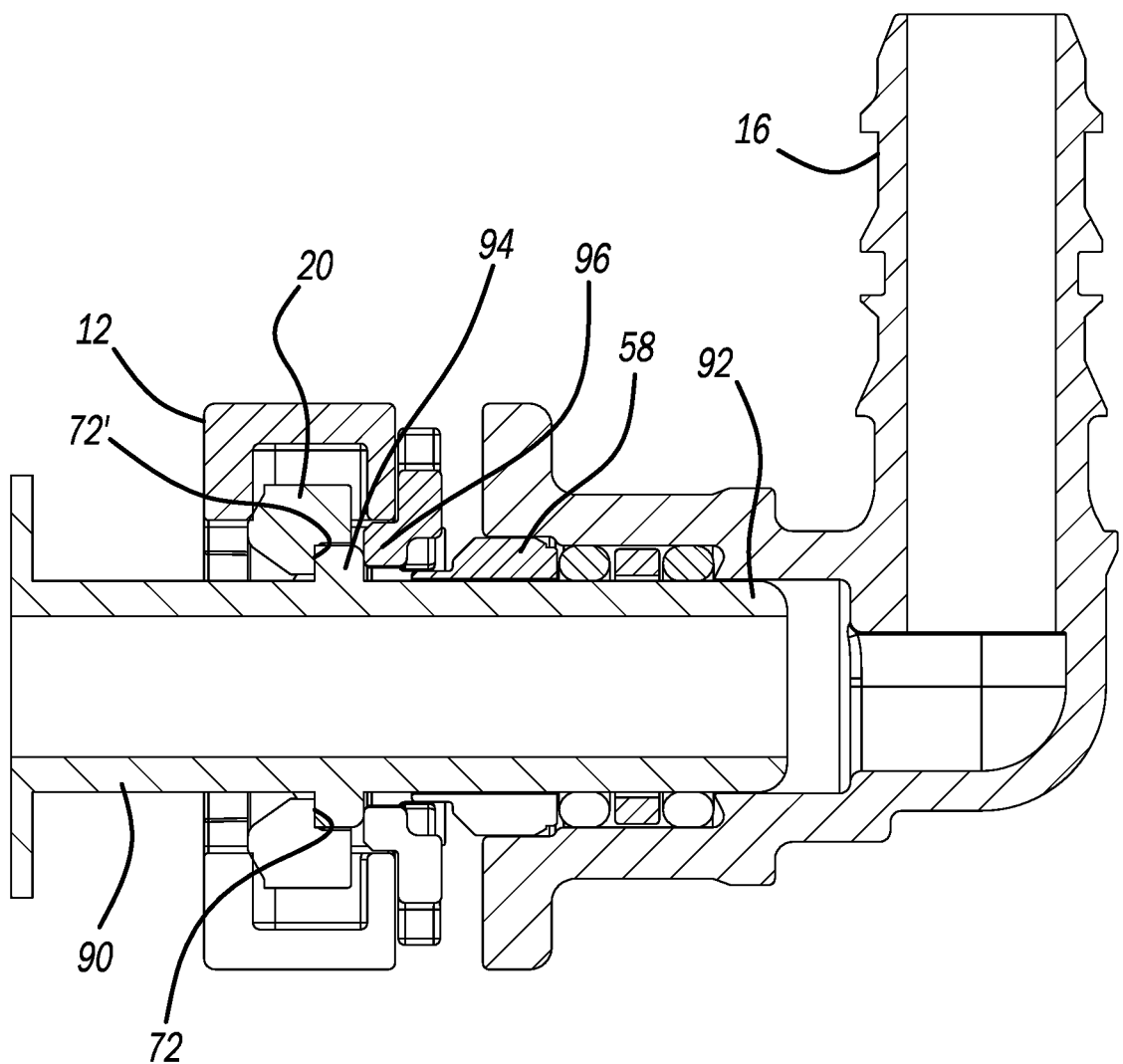
FIG. 15 is a side sectional view of the dual-latch quick connector of FIG. 1 upon insertion of a fluid line therein with the raised upset of the fluid line captured by the spring latch but prior to engagement by the sliding lock latch.
Figure 16:
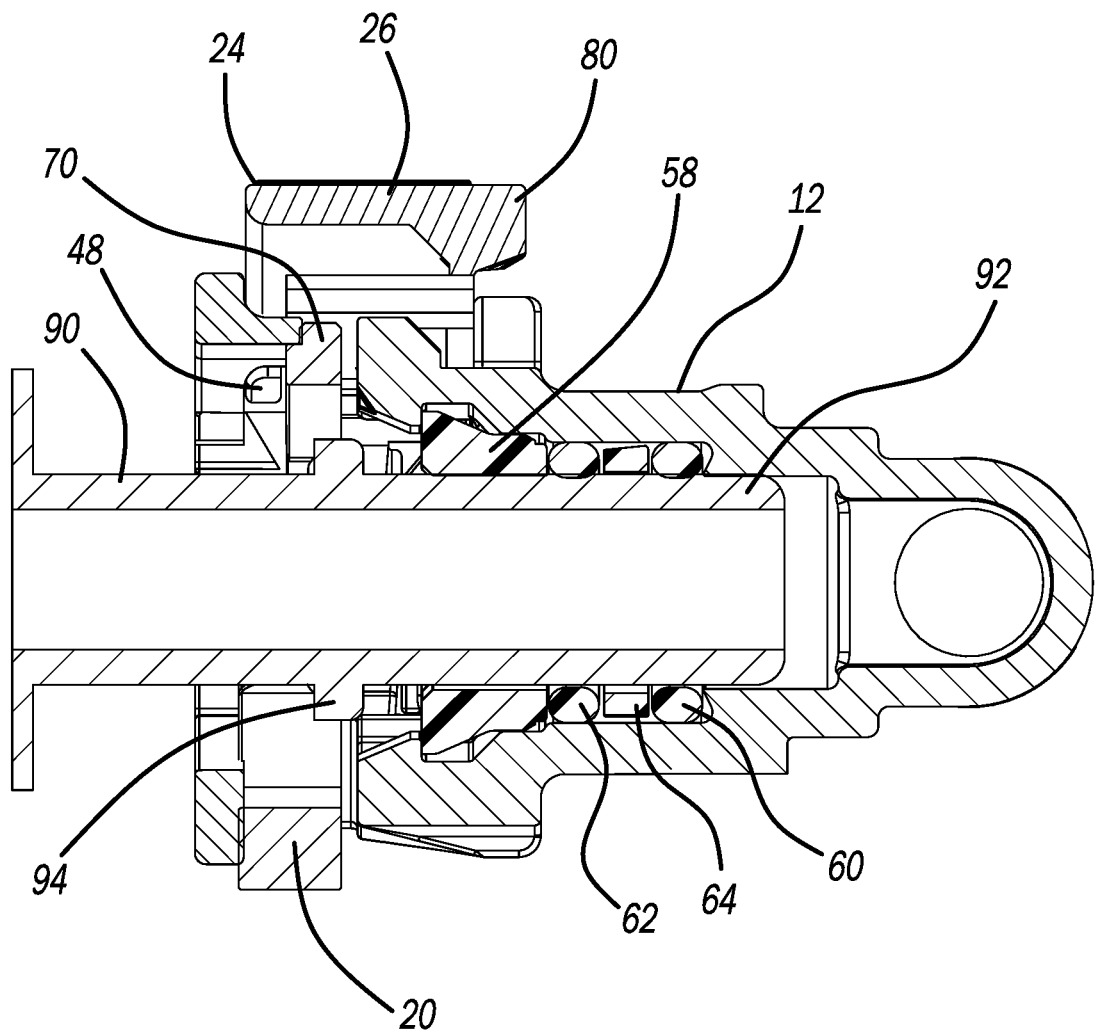
FIG. 16 is a sectional view from the underside of the dual-latch quick connector of FIG. 1 upon insertion of a fluid line therein with the raised upset of the fluid line captured by the spring latch but prior to engagement by the sliding lock latch.

Upon initial insertion of the fluid line input end 14 of the fluid line 90 into the fluid line input end 14 of the housing 12 as illustrated in FIG. 12, the raised upset or bead 94 contacts the ramped surfaces 44 and 44' of the engaging bodies 34 and 34' respectively. The installer proceeds with insertion until the raised upset or bead 94 forces apart the engaging bodies 34 and 34'. The slight resistance created by the biasing forces of the spring webs 36 and 38 of the spring latch 20 are overcome by the installer without much difficulty as the raised upset or bead 94 is inserted, thereby causing the engaging bodies 34 and 34' to move away from each other.

Movement of the fluid line 90 continues until the raised upset or bead 94 rests against a radial shoulder 96 formed within the housing 12 as illustrated in FIGS. 13 through 16. At this same time, the biasing forces of the spring webs 36 and 38 urge the separated engaging bodies 34 and 34' return to their resting positions whereby the fluid line retaining shoulders 72 and 72' and the radial shoulder 96 capture and retain the raised upset or bead 94 therebetween. The installer is notified of the completed insertion of the fluid line 90 into the dual-latch quick connector 10 by an audible "click" generated by the movement of the engaging bodies 34 and 34' to their resting and fluid-line engaging positions.

The first part of the installation of the fluid line 90 into the dual-latch quick connector 10 is completed with the fluid line 90 having been inserted and locked into place from removal by the spring latch 20. In this position, the fluid line 90 is held against removal by the retaining shoulders 72 and 72' of the spring latch 20. However, if it is desired that the fluid line 90 be removed from the dual-latch quick connector 10 for any reason at this time, the installer presses upon the release button 40 of the spring latch 20. By so doing, the biasing forces of the spring webs 36 and 38 are overcome, causing the engaging bodies 34 and 34' to move away from one another, thereby releasing the fluid line 90 from engagement with the retaining shoulders 72 and 72' of the spring latch 20.

However, the fluid line 90 into the dual-latch quick connector 10 may be fixed into position against release by the spring latch 20 by the installer undertaking the second part of the installation which is to move the sliding lock latch 24 from its pre-insertion, raised position to its lowered and locked position. This locked position is illustrated in FIGS. 17 through 20.

Figure 17:
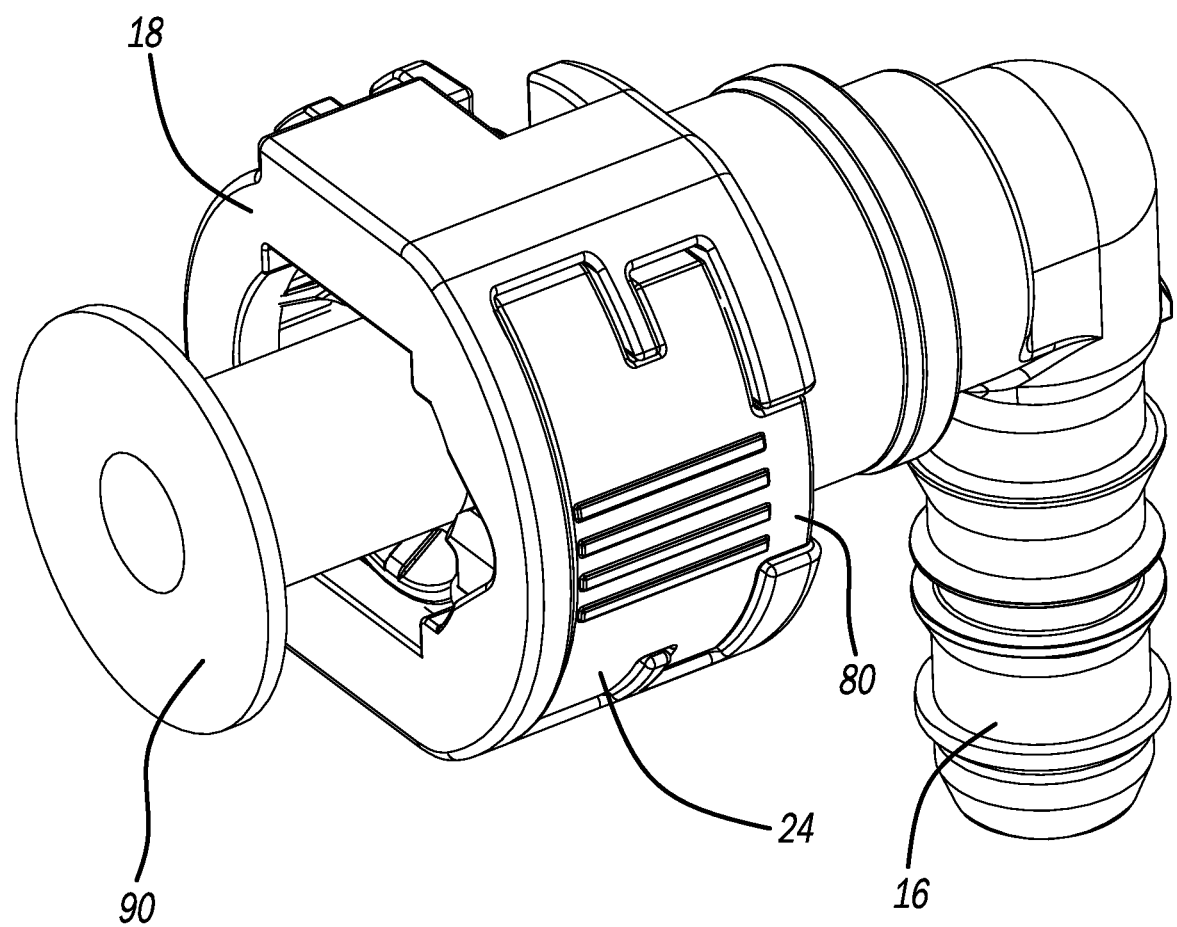
FIG. 17 is a view of the dual-latch quick connector similar to the views of FIGS. 12 and 13 but without being a sectional view and illustrating the sliding lock latch moved to its locking position.

With reference to FIG. 17, the sliding lock latch 24 has been moved by the installer to its locked position which prevents release by the spring latch 20. The upper surface of the cover portion 26 of the sliding lock latch 24 is generally flush with the periphery of the housing 12.

Figure 18:
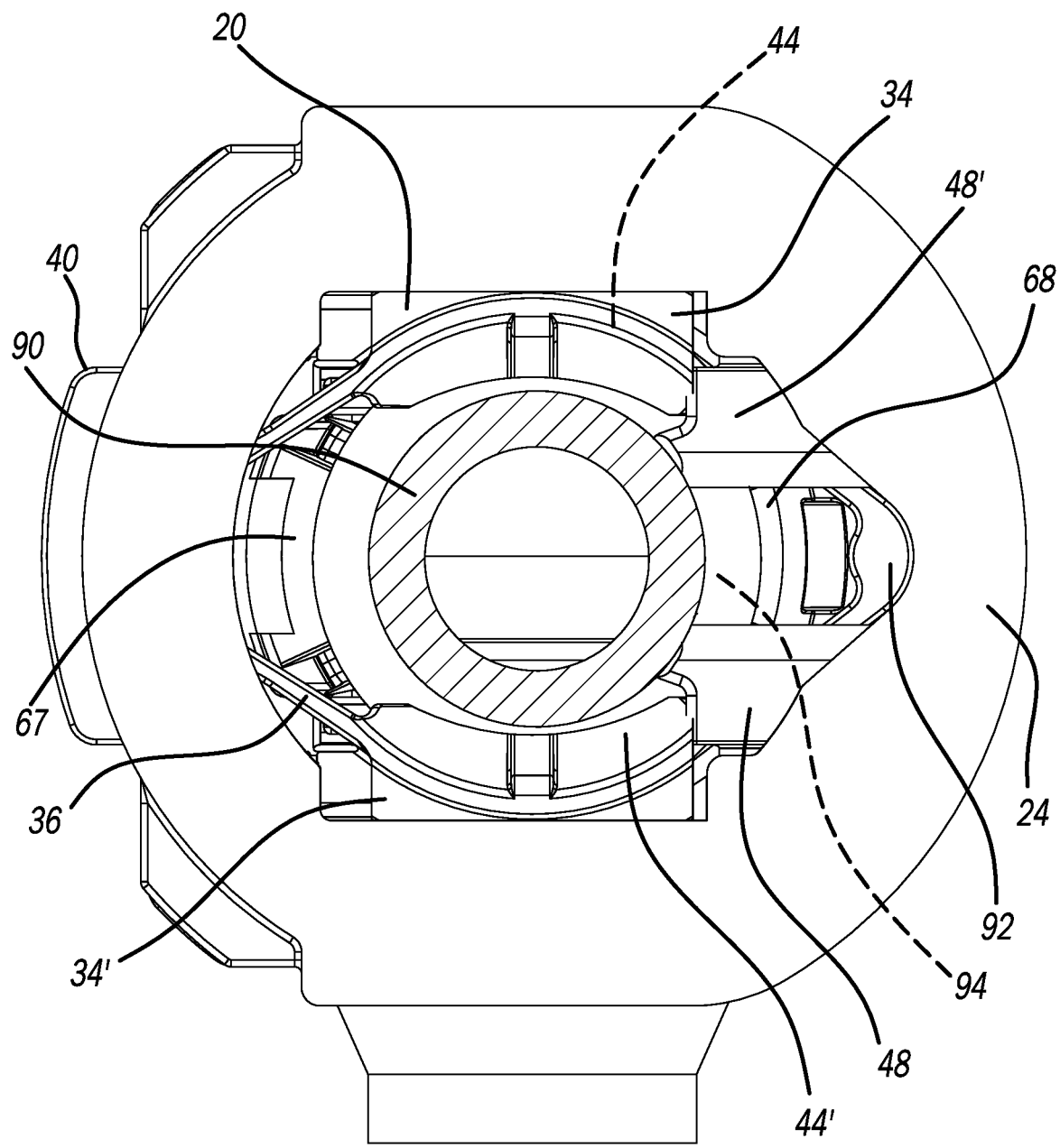
FIG. 18 is an end view of the dual-latch quick connector similar to the view of FIG. 3 but illustrating a fluid line having been inserted and the sliding lock latch in its locking position.
Figure 19:
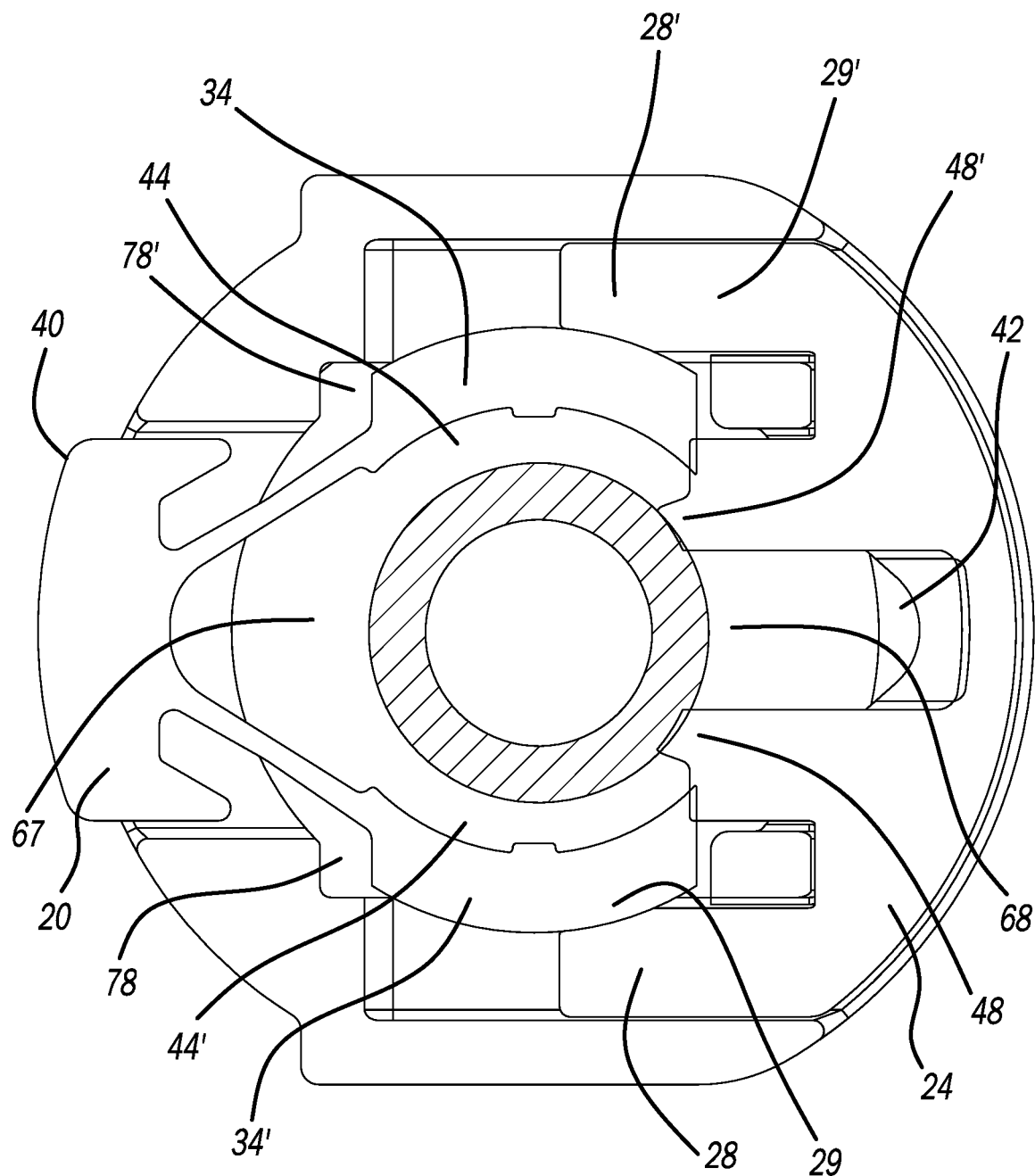
FIG. 19 is an end view of the dual-latch quick connector similar to the view of FIG. 4 but illustrating the sliding lock latch in its locking position.

As illustrated in FIG. 18, the fluid line 90 is securely locked into place by the spring latch 20 which is prevented from release by the sliding lock latch 24. In this position, the raised upset or bead 94 is shown captured by both the engaging bodies 34 and 34' as well as by the fluid line interlock arms 48 and 48' that extend from the cover 26 of the sliding lock latch 24. The sliding lock latch 24 concurrently security against release of the fluid line 90 from the dual-latch quick connector 10 while at the same time enhancing its fluid tight seal. In FIG. 19, the fluid line 90 is not illustrated so as to reveal additional detail of the locking arrangement. As shown in FIG. 19, the interference abutment face 29 of the spring release interference abutment 28 is in contact with the engaging body 34 while the interference face 29' of the spring release interference abutment 28' is in contact with the engaging body 34'. So positioned, it is not possible for the spring latch 20 to be released by applying pressure to the release button 40 as the engaging bodies 34 and 34' cannot be disengaged from the raised upset or bead 94 when the sliding lock latch is in its locked position.

FIG. 19 also illustrates an additional safety feature of the dual-latch quick connector 10 of the disclosed inventive concept. Particularly, the fluid line interlock arms 48 and 48' that extend from the cover 26 of the sliding lock latch 24 not only function to more securely engage the fluid line 90 when held in position by the spring latch 20 and to enhance the fluid sealing properties of the dual-latch quick connector 10, but also function to prevent the insertion of the fluid line 90 if the sliding lock latch 24 is moved into its locking position before the fluid line 90 has been inserted. In the event that the sliding lock latch 24 has been moved to its locked position before the fluid line 90 is installed, The sliding lock latch 24 is prevented from being moved back to its initial unlocked position after having been moved to its locked provision. In this way, a locked dual-latch quick connector 10 cannot be inadvertently installed during the assembly operation. This feature is illustrated in FIGS. 20-22.

Figure 20:
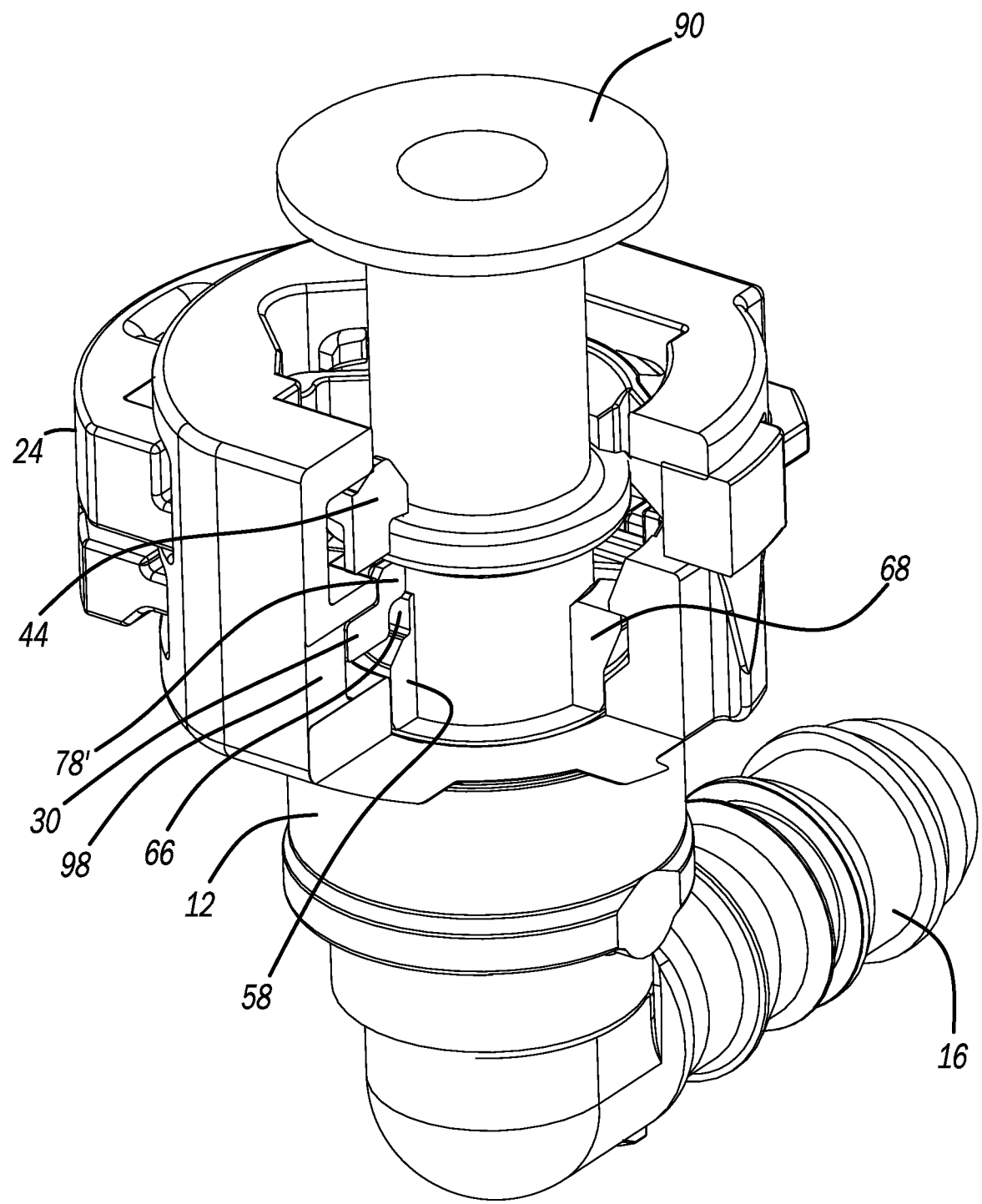
FIG. 20 illustrates a cutaway perspective view of the dual-latch quick connector showing the sliding lock latch in its unlocked position and illustrating the latched arrangement of the arms of the sliding lock latch when in its locking position.

Referring to FIG. 20, a cutaway perspective view of the dual-latch quick connector 10 is illustrated. In this figure, the sliding lock latch 24 is in its unlocked position. FIG. 20 is also instructive in showing an aspect of the relationship between the lock washer 58 and the sliding lock latch 24. In the unlocked position, the lock washer 58 operates to prevent engagement of the sliding lock latch 24 with the housing 12 by forcing the sliding lock latch locking tab 78 to ride upon the rail 66. In this way the lock washer 58 operates as a housing contact limiter for the latching arms 30 and 30'. A lock latch interface 98 formed on the housing 12 prevents removal of the sliding lock latch 24 from the housing by contact with the housing release prevention hooks 74 and 74'.

Figure 21:
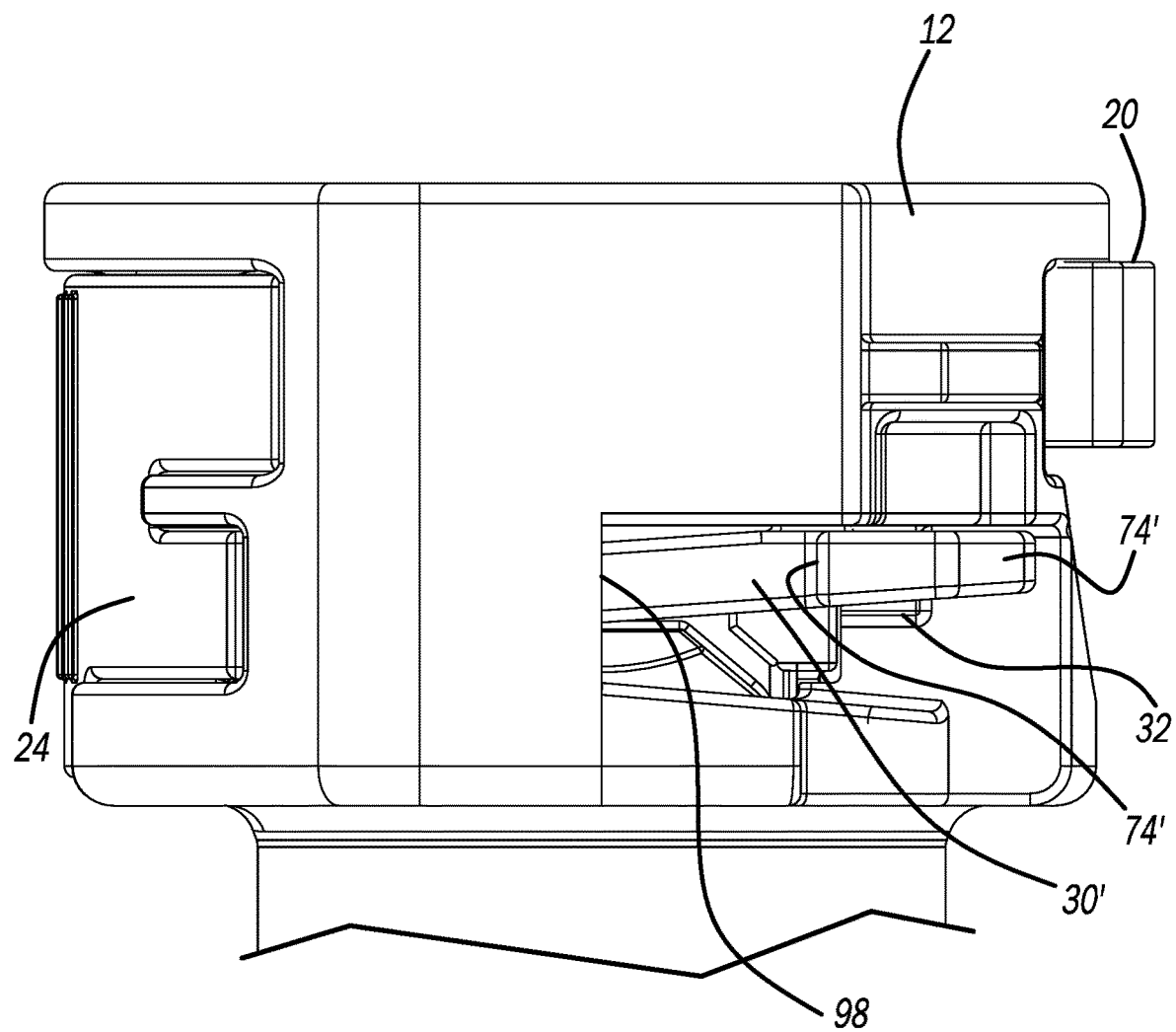
FIG. 21 illustrates a partial side view of the dual-latch quick connector showing the sliding lock latch in its locked position and illustrating the latched arrangement of the arms of the sliding lock latch when in its locked position.
Figure 22:
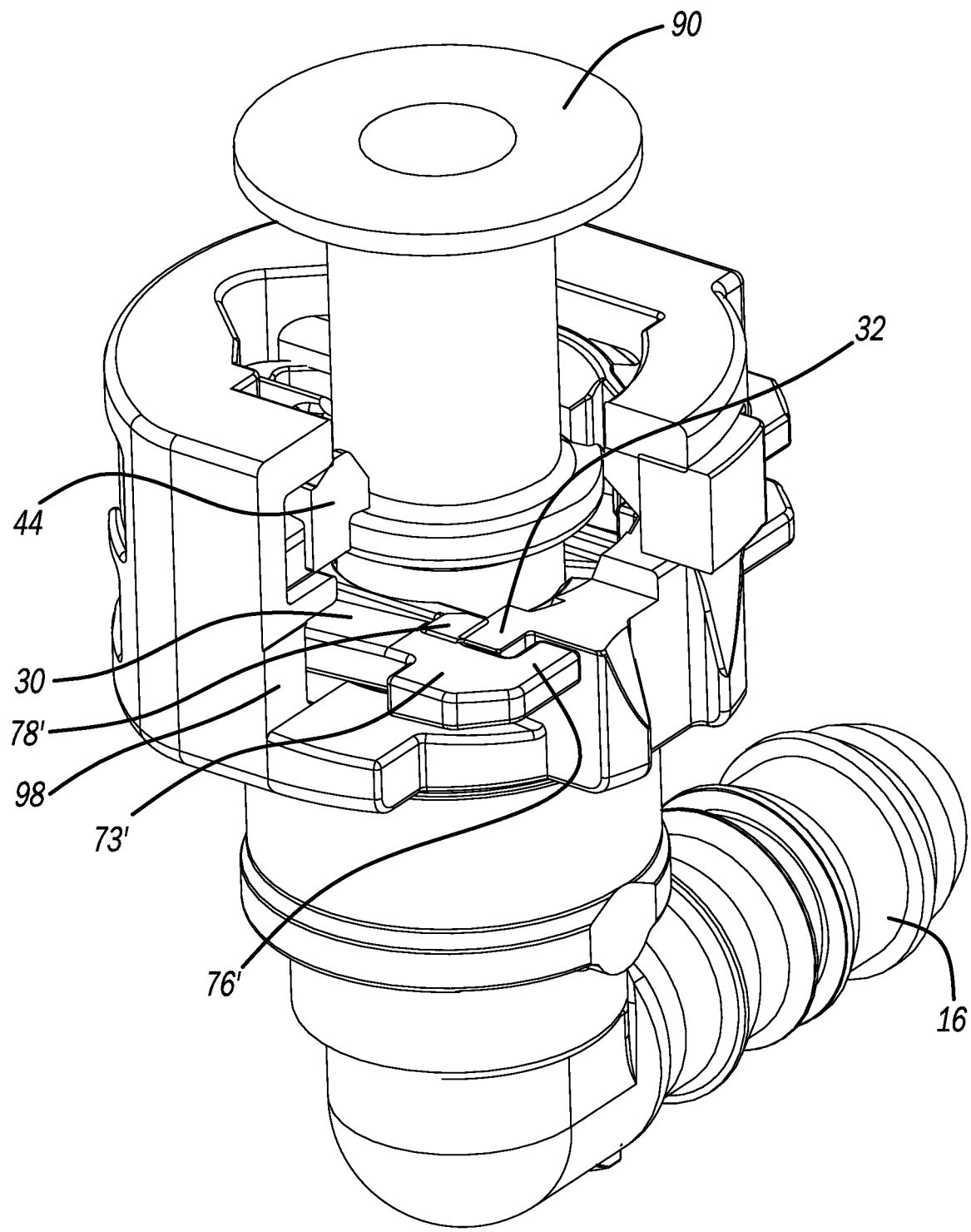
FIG. 22 is similar to FIG. 20 but showing the sliding lock latch in its unlocked position.

When the sliding lock latch 24 is moved to its locked position as illustrated in FIGS. 21 and 22, the latching arms 30 and 30' become locked by engagement with the latching projections (of which 32 is illustrated) between the blockers (of which 76' is illustrated) and the sliding lock latch locking tabs (of which sliding lock latch locking tab 78' is illustrated). In addition to the sliding lock latch 24 being locked against removal, in the position illustrated in FIGS. 21 and 22 the spring release interference abutment 28 is moved into its engagement position with the engaging body 34 of the spring latch 20 and the spring release interference abutment 28' is moved into its engagement position with the engaging body 34', thereby preventing release of the fluid line or insertion part 90 from the housing 12 as illustrated in FIG. 19 and as described in conjunction therewith.

According to the disclosed inventive concept, a secure and leak-proof connection can be made between a fluid line and a quick connector. The dual-flange quick connector described and illustrated herein provides two distinct and sequential operations that must be achieved to verify correct assembly. The dual-flange quick connector of the disclosed inventive concept also provides a measure of security against attempted fluid line insertion in the event that the sliding lock latch has been inadvertently moved to its locked position. In addition, once the fluid line has been installed and the sliding lock latch has been moved to its locked position, it is no longer possible for the fluid line to be removed from the quick connector by manipulation of the spring latch.

The disclosed inventive concept offers further advantages over the prior art. In addition to offering primary latching with secondary verification, the sliding lock latch of the disclosed dual-latch quick connector, shipped in its unlocked position, is robust and resists unintended locking. Also due to its robustness, the sliding lock latch resists accidental locking during the installation process when being handled by the installer. The strategic placement of the sliding lock latch also allows the installer to complete the installation process from one side, thus making the dual-latch quick connecter usable in even the most limiting of environments. The quick connector additionally may be serviced from a single side which, in this case, is the side opposite the sliding lock latch side.

One skilled in the art will readily recognize from such discussion, and from the accompanying drawings and claims that various changes, modifications and variations can be made therein without departing from the true spirit and fair scope of the invention as defined by the following claims.

What is claimed is:

1. A connector assembly, comprising:
   a housing having a bore and a latching arm receptacle transverse to the bore, wherein the bore is configured to receive an insertion part having a raised upset;
   a spring latch encircling the bore and having radially-spaced engaging bodies; and
   a sliding lock latch having a latching arm and an abutment, the latching arm slidably disposed within the latching arm receptacle for movement to a locked position,
   wherein the abutment restricts the centrifugal expansion of the radially-spaced engaging bodies relative to the bore in the locked position such that the radially-spaced engaging bodies are configured to prevent disengagement from the raised upset when the sliding lock latch is in the locked position.

2. The connector assembly of claim 1, wherein the engaging bodies include a first expansion-restricting surface and the abutment includes a second expansion-restricting surface, the expansion-restricting surfaces being configured so as to cooperatively restrict centrifugal expansion in the locked position.

3. The connector assembly of claim 2, wherein the expansion-restricting surfaces are arcuate.

4. The connector assembly of claim 1, wherein the sliding lock latch includes a cover portion, the latching arm and the abutment extending from the cover portion.

5. The connector assembly of claim 1, wherein the sliding lock latch includes a pair of spaced apart latching arms, each latching arm having a bore-facing inner surface and an outer surface facing opposite the bore-facing inner surface, the inner surface being interlocked with the housing in the locked position.

6. The connector assembly of claim 1, wherein the housing has an outer periphery and wherein the sliding lock latch does not extend beyond the outer periphery of the housing when in the locked position.

7. The connector assembly of claim 1, wherein said sliding lock latch includes a pair of spaced apart latching arms and a pair of spaced apart abutments.

8. The connector assembly of claim 1, wherein the sliding lock latch includes spaced apart fluid line interlock arms extending therefrom and toward the bore.

9. The connector assembly, comprising:
   a housing having a latching arm receptacle;
   a sliding lock latch having a latching arm slidably disposed within the latching arm receptacle, the latching arm having a foot portion with a release prevention hook and a blocker; and
   a lock washer disposed in the housing having a rail with an interference portion recessed into the rail,
   wherein the release prevention hook is engaged with the housing and the blocker is engaged with the interference portion, and wherein movement of the blocker is being constrained by the interference portion of the ramp by being locked therewith when the sliding lock latch is in the unlocked position.

10. The connector assembly of claim 9, wherein the sliding lock latch is engageable with the lock washer.

11. The connector assembly of claim 9, wherein the lock washer includes a pair of spaced apart rails with each rail terminating in a said interference portion.

12. A connector assembly comprising:
 a housing having a bore and a latching arm receptacle;
 a spring latch encircling the bore and having radially-spaced engaging bodies;
 a sliding lock latch disposed in the latching arm receptacle and slidably movable from an unlocked position to a locked position, the sliding lock latch having an abutment and a latching arm having a foot portion, the foot portion including a release prevention hook and a movable blocker, the abutment restricting movement of the radially-spaced engaging bodies when in the locked position; and
 a lock washer disposed in the housing, the washer including a rail having an interference portion recessed into the rail, movement of the blocker being constrained by the interference portion of the rail by being locked therewith.

13. The connector assembly of claim 12, wherein the engaging bodies include a first expansion-restricting surface and the abutment includes a second expansion-restricting surface.

14. The connector assembly of claim 13, wherein the spring latch is centrifugally expandable and wherein the first expansion-restricting surface of the engaging bodies and the second expansion-restricting surface of the abutment being configured to restrict centrifugal expansion of the spring latch when in the locked position.

15. The connector assembly of claim 13, wherein the expansion-restricting surfaces are arcuate.

16. The connector assembly of claim 12, wherein the latching arm has a bore-facing inner surface and an outer surface facing opposite the bore-facing inner surface, the inner surface being interlockable with the housing.

17. The connector assembly of claim 12, wherein the housing has an outer periphery and wherein the sliding lock latch does not extend beyond the outer periphery of the housing when in the locked position.

* * * * *